(12) United States Patent
Michaelis et al.

(10) Patent No.: US 11,507,568 B2
(45) Date of Patent: Nov. 22, 2022

(54) EVENT STREAM PROCESSING SYSTEM, EVENT STREAM PROCESSING METHOD, EVENT STREAM PROCESSING PROGRAM

(71) Applicant: FUJITSU LIMITED, Kawasaki (JP)

(72) Inventors: Julius Michaelis, Rosenheim (DE); Yasuhiko Kanemasa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 96 days.

(21) Appl. No.: 17/181,592

(22) Filed: Feb. 22, 2021

(65) Prior Publication Data
US 2021/0326335 A1 Oct. 21, 2021

(30) Foreign Application Priority Data
Apr. 15, 2020 (JP) .............................. JP2020-072691

(51) Int. Cl.
*G06F 16/23* (2019.01)
*G06F 16/215* (2019.01)
*G16Y 20/00* (2020.01)

(52) U.S. Cl.
CPC ........ *G06F 16/2379* (2019.01); *G06F 16/215* (2019.01); *G16Y 20/00* (2020.01)

(58) Field of Classification Search
USPC ......................................................... 707/703
See application file for complete search history.

(56) References Cited

U.S. PATENT DOCUMENTS

| 6,725,281 B1* | 4/2004 | Zintel .................. H04L 69/329 709/224 |
| 8,028,301 B2* | 9/2011 | Repasi .................... G06F 21/52 726/22 |
| 2005/0278708 A1* | 12/2005 | Zhao ........................ H04L 41/06 717/136 |
| 2007/0288459 A1 | 12/2007 | Kashiyama et al. |
| 2010/0332920 A1* | 12/2010 | Ashida .................. G06F 3/0481 714/57 |
| 2017/0083386 A1 | 3/2017 | Wing et al. |
| 2019/0243693 A1 | 8/2019 | Nakagawa et al. |

FOREIGN PATENT DOCUMENTS

| EP | 3522014 A1 | 8/2019 |
| JP | 2007-328716 A | 12/2007 |
| JP | 2014-157510 A | 8/2014 |
| JP | 2019-133579 A | 8/2019 |

OTHER PUBLICATIONS

Extended European Search Report dated Jul. 19, 2021 for corresponding European Patent Application No. 21156536.1, 8 pages.

\* cited by examiner

*Primary Examiner* — Cam Linh T Nguyen
(74) *Attorney, Agent, or Firm* — Fujitsu Patent Center

(57) ABSTRACT

An event stream processing system having a processor, wherein the processor registers a temporary object when the object of an event message is unregistered in response to the event message from an event generating device, stores the event message in a pending manner, and Issues an error message. The processor converts the temporary object to a permanent object in response to an automatically-issued event generation message in response to the error message, updates state of the object with state value of the held event message, and executes plug-in corresponding to the updated state.

8 Claims, 20 Drawing Sheets

FIG. 7

EVENT MESSAGE   EV_MSG

| mid | oid | MSG_type : EVENT | stage : 2 | eventTime | state : speed state_value : 45 | state : position_lat state_value : 35.679 |
|---|---|---|---|---|---|---|

CONTROL MESSAGE   CN_MSG(createObject)

| mid | oid | MSG_type : OBJECT GENERATION | stage : 2 | groups : car, M1 |
|---|---|---|---|---|

CONTROL MESSAGE   CN_MSG(addPlugin)

| mid | oid | MSG_type : PLUG-IN ADDITION | plg_id : plg_10 | group : car state : speed | plg_code : yv66vgAADhoge.. |
|---|---|---|---|---|---|

ERROR MESSAGE   ER_MSG

| mid | oid | MSG_type : ERROR | stage : 2 |
|---|---|---|---|

EVENT STREAM PROCESSING SYSTEM, EVENT STREAM PROCESSING METHOD, EVENT STREAM PROCESSING PROGRAM

CROSS-REFERENCE TO RELATED APPLICATION

This application is based upon and claims the benefit of priority of the prior Japanese Patent Application No. 2020-072691, filed on Apr. 15, 2020, the entire contents of which are incorporated herein by reference.

FIELD

The present invention relates to an event stream processing system, an event stream processing method, and an event stream processing program.

BACKGROUND

An event stream processing system includes a plurality of computer nodes (hereinafter simply referred to as nodes), receives a lot of events generated in IoT devices in the real world, e.g., vehicles and smartphones, and performs event data processing in streaming. Event processing is, for instance, processing of executing a program associated with each event. In real time in the event stream processing system, since data of a lot of events is stream-processed, "objects" corresponding to IoT devices that generate events are, in advance, allocated to event processing units of a plurality of nodes and registered therein according to a predetermined rule. The object plays a role in defining details of stream processing implemented on various types of event data that arrives from an IoT device by being associated with a program called a plug-in which is executed when event data arrives from the device (IoT device) that generates an event. In addition, the event stream processing system distributes or allocating event messages, which arrive from IoT devices, to event processing units in which corresponding objects are registered, such that the event processing units execute plug-ins associated with events included in the event messages. In this manner, the event stream processing system receives a lot of event streams transmitted from a plurality of IoT devices in real time and stream-processes, in real time, plug-ins corresponding to events.

Related prior arts are Japanese Laid-open Patent Publication No. 2019-133579, Japanese Laid-open Patent Publication No. 2014-157510 and Japanese Laid-open Patent Publication No. 2007-328716.

SUMMARY

However, as a lot of IoT devices emerge day after day, cases occur frequently, in which objects associated with IoT devices that have transmitted event messages are not registered yet in event processing units of a plurality of nodes at points in time at which the event messages transmitted from the IoT device have arrived. In a case like this, the event stream processing system is not able to perform event message processing because the processing is performed on the assumption that objects are registered in advance in event processing units of a plurality of nodes. As a result, stream processing of transmitted event messages is not performed, hence, a service of processing, in real time, events is not able to be appropriately provided. For instance, when the event stream processing system outputs to a log an event message for which an object has not been registered and which has become an error, and processes registration of a new object of an event message manually or automatically based on the log output, and thereafter resumes event stream processing, then real-time event stream processing is not able to be implemented.

According to an aspect of the embodiments, an event stream processing system including: a processor, and a storage which is accessed by the processor and stores an object table, in which an object identifier for identifying an object is associated with state information of the object, and also stores a plug-in which executes processing corresponding to the state information, wherein the processor executes an event processing which, in response to an event message from an event generation device, which is an event generation source, and with reference to the object table, updates state information of an object table corresponding to an object identifier of the event message, and executes the plug-in corresponding to updated state information, and an object generation processing, the event processing includes an object management which, in response to a first object generation message, generates an entry of the object table corresponding to an object identifier of the first object generation message, the event processing generates, in response to the event message and when the object table of the object identifier of the event message is unregistered, a provisional object table corresponding to the object identifier of the event message, and stores the event message in association with the provisional object table, and moreover issues an error message having the object identifier, the object generation processing issues, in response to the error message, a second object generation message having the object identifier, and the event processing generates, in response to the second object generation message, a permanent object table from the provisional object table conforming to the object identifier of the second object generation message and executes a plug-in corresponding to the object identifier and state information of the event message stored in association with the provisional object table.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is a diagram illustrating an example of an event message and a control message.

DESCRIPTION OF EMBODIMENTS

Overview of Event Stream Processing System

An event stream processing system is a parallel distribution stream processing system in which a plurality of computer nodes process events transmitted from a plurality of event generation devices (e.g., IoT devices of connected cars and the like) of the real world which generate events. Event data is a value of an internal state (a state value), e.g., a speed and a position of a connected car. Event data is collected in a real-time distribution event stream processing system present in a data center. Then, the event stream processing system executes processing registered in advance whenever an event message (event data) arrives to provide a service based on a processing result. The event stream processing system executes service processing in an event-driven manner at a timing at which a value of a state of an object has changed.

Figure 1:
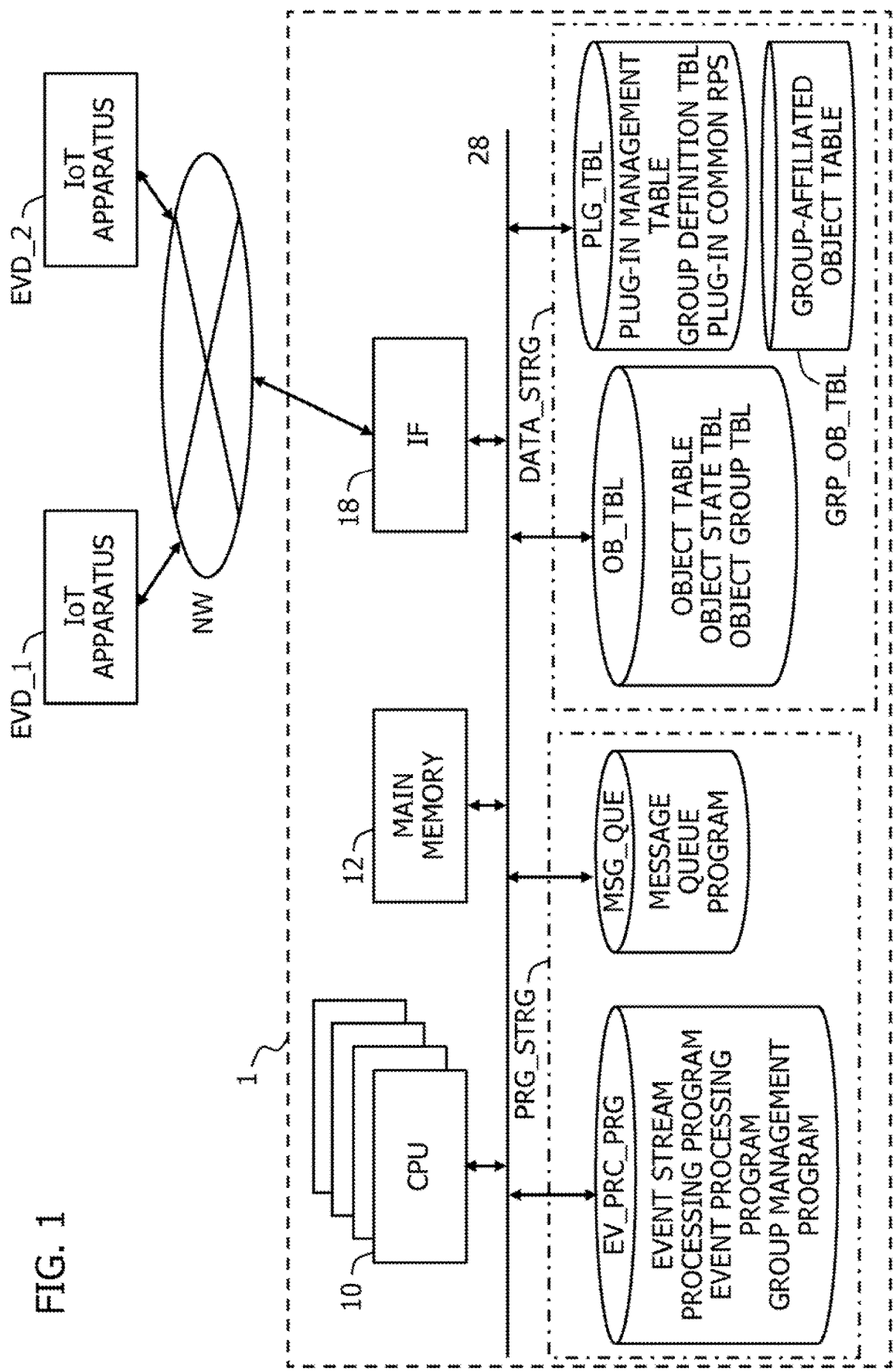
FIG. 1 is a diagram illustrating an overview of the event stream processing system.

FIG. 1 is a diagram illustrating an overview of the event stream processing system. The event stream processing system 1 is a computer system, e.g., a personal computer or a server. The computer system 1 includes processors 10 that are a plurality of central processing units (CPUs), a main memory 12 that can be accessed by the processors, an interface IF with an external network NW and peripheral devices (not illustrated), and a bus 28 for connecting these components. The computer system is accessed by event generation devices EVD_1 and EVD_2 that are event generation sources through the network NW. In addition, the event stream processing system 1 includes a program storage PRG_STRG in which various programs are stored and a data storage DATA_STRG in which various types of data are stored. A plurality of computer systems 1 or a plurality of processors 10 correspond to computer nodes.

An event stream processing program EV_PRC_PRG including an event processing program and a group management program, and a message queue program MSG_QUE are stored in the program storage PRG_STRG. In addition, an object table OB_TBL, a plug-in management table PLG_TBL, and a group-affiliated object table GRP_OB_TBL are stored in the data storage DATA_STRG. The object table OB_TBL includes an object state table and an object group table. In addition, the plug-in management table PLG_TBL includes a group definition table and a plug-in common repository. These programs and tables will be described in detail later.

Figure 2:
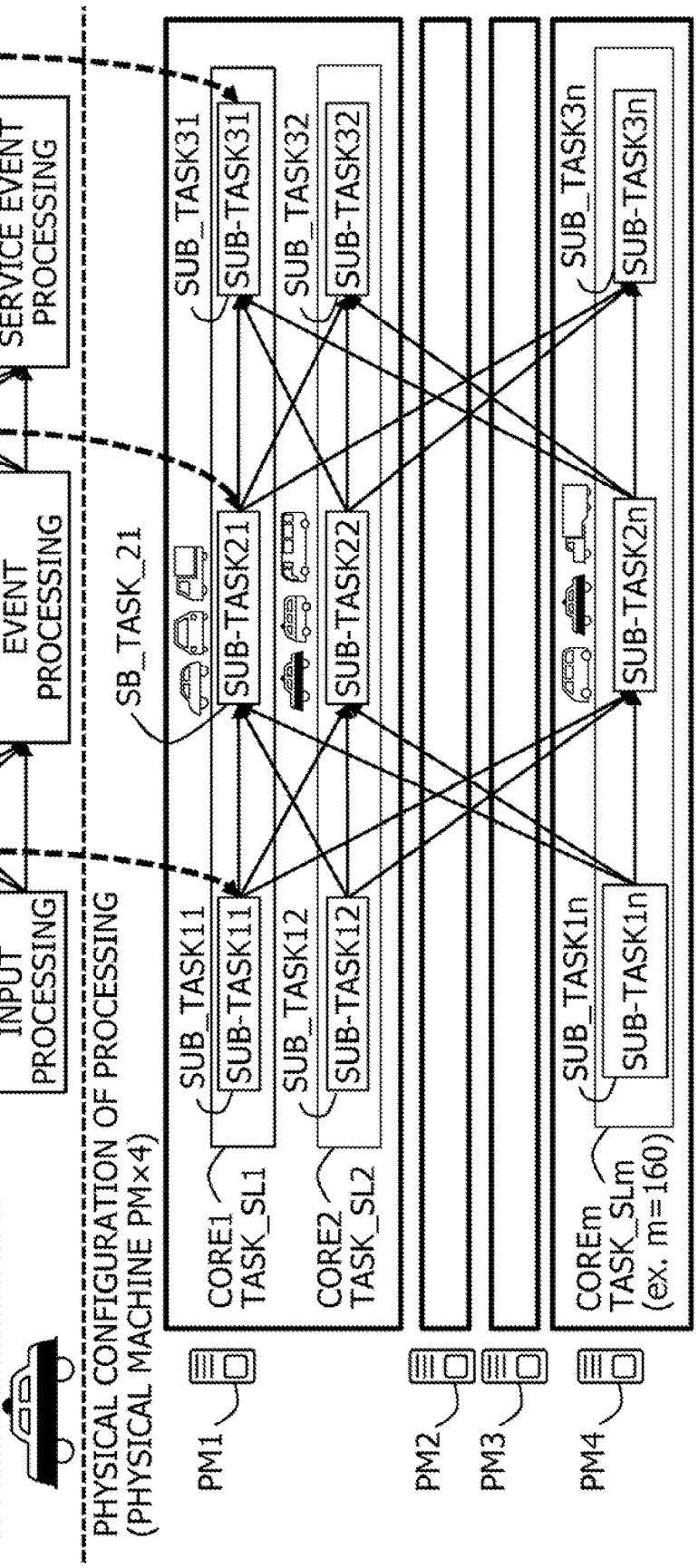
FIG. 2 is a diagram illustrating a logical configuration and a physical configuration of processing of the event stream processing system.

FIG. 2 is a diagram illustrating a logical configuration and a physical configuration of processing of the event stream processing system. In the logical configuration of the processing, pipelined configurations each having multiple processing stages is provided to each node. Event messages EV_MSG transmitted from a plurality of IoT devices that are event generation sources are distributed to predetermined processing stages, and each processing stage executes, in response to an update of a state of an object included in the corresponding event message, a plug-in corresponding to the state.

As Illustrated in the logical configuration of the processing, a processing stage of each node includes an input processing unit IN_PRC, an event processing unit EV_PRC, and a service event processing unit SV_EV_PRC, for instance. An arriving event message EV_MSG is transferred to an input processing unit of an arbitrary node. The input processing unit of the transfer destination performs event message verification processing and the like and transfers information, an object ID (identifier), a state name and a state value included in the event message to an event processing unit EV_PRC allocated based on the object ID and a stage number included in the event message. In the event processing unit EV_PRC, data (the state name and a group name) of the object handled thereby is registered. When the state value has been updated in the received event data, the event processing unit executes a predetermined plug-in for the updated state value.

An object corresponds to a vehicle or the like of the real world and also corresponds to a service or the like. That is, an object is associated with a specific object (person or vehicle) that is an event generation source or associated with a service provided by intensively processing event data thereof. In addition, an event is an update of a state of an object.

The aforementioned event processing unit EV_PRC executes a plug-in with respect to an update of a state (e.g., an internal state of a vehicle) of an object (e.g., a vehicle) of the real world and transfers an event message including an update (e.g., movement of the vehicle) of the state of the object (e.g., a degree of congestion of vehicles in a certain area) of a service to the following service event processing unit SV_EV_PRC. Then, service event processing unit executes a plug-in corresponding to the state of the object of the service.

As illustrated in the physical configuration of the processing in FIG. 2, the event stream processing system generates a plurality of sub-tasks SUB_TASK in task slots TASK_SL generated by a plurality of processor cores CORE of a plurality of physical machines PM. The plurality of sub-tasks each correspond to the input processing units, event processing units and service event processing units of the logical configuration. For instance, a sub-task SUB_

TASK21 processes events of a plurality of objects (e.g., vehicles) registered in an event processing unit EV_PRC of the logical configuration.

For instance, when each of 4 physical machines PM1 to PM4 has 40 processor cores CORE, 160 processor cores CORE1 to COREm respectively generate task slots TASK_SL1 to TASK_SLm (m=160). In addition, a plurality of event processing units and service event processing units configured in a pipeline are associated with stage numbers in a pipeline direction (right in the figure).

An event message EV_MSG includes an object ID, a message type, a stage number, a state name, and a state value as will be described later. The input processing unit IN_PRC calculates and generates a hash value of an object ID of an event message and transfers the event message to an event processing unit EV_PRC of a sub-task SUB_TASK identified by a stage number in a task slot TASK_SL identified by the hash value.

Figure 3:
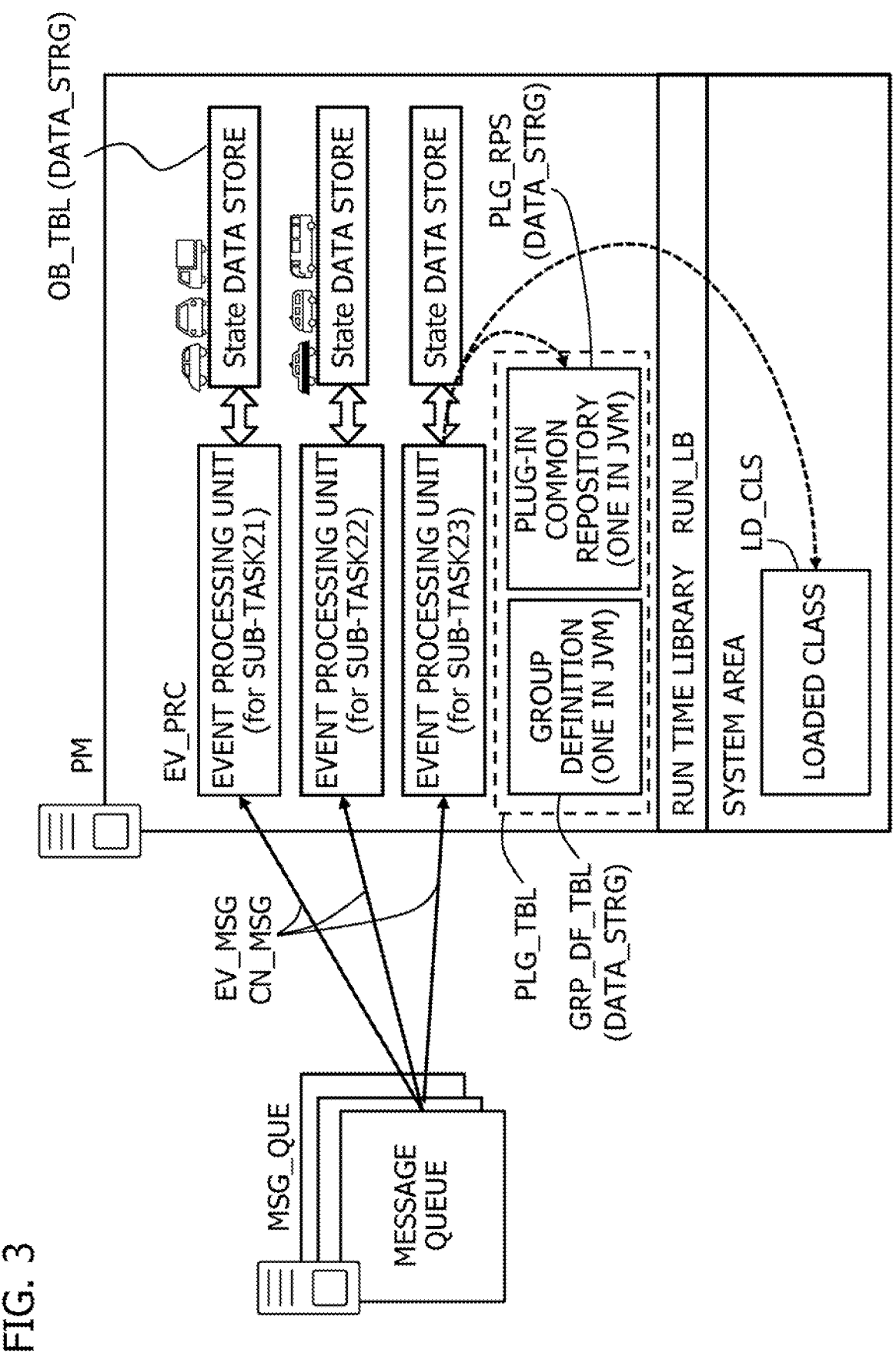
FIG. 3 is a diagram illustrating a configuration example of sub-tasks for object processing of one physical machine PM.

FIG. 3 is a diagram illustrating a configuration example of sub-tasks for object processing of one physical machine PM. In this physical machine PM, event processing units EV_PRC are generated in sub-tasks 21 to 23 of three processor cores CORE. The processing unit is a task or processing of the event processing program. Message queues MSG_QUE in which messages are queued are commonly provided for the plurality of event processing units. Event messages transmitted from objects and various control messages transmitted from a service manager and the like are queued in message queues. In addition, each event processing unit updates a state value of an object table OB_TBL registered in each event processing unit to a state value of an event message with reference to the object table OB_TBL and a plug-in management table PLG_TBL commonly registered in a plurality of types of event processing, and executes a plug-in in the plug-in management table PLG_TBL which corresponds to the updated state value. The plug-in management table PLG_TBL includes a group definition table GRP_DF_TBL and a plug-in common repository PLG_RPS.

The physical machine PM stores a run time library RUN_LB and a loaded class LD_CLS obtained by integrating a plug-in binary (class) into an execution program in a storage. The event processing unit executes the loaded class at the time of plug-in execution.

Figure 4:
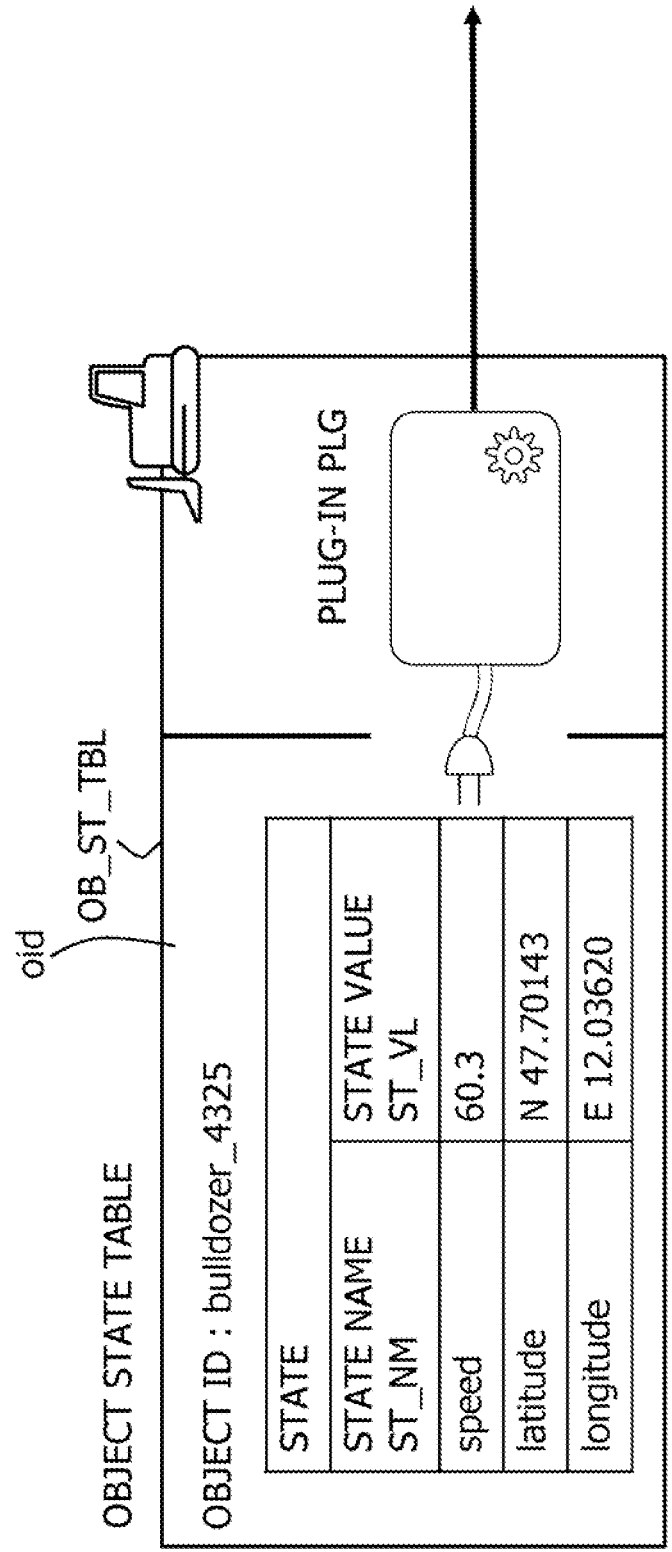
FIG. 4 is a diagram illustrating an example of an object state table included in an object table OB_TBL

FIG. 4 is a diagram illustrating an example of an object state table included in an object table OB_TBL. As illustrated in FIG. 1, the object table OB_TBL includes the object state table OB_ST_TBL in which an object ID is associated with a state. In addition, the object table OB_TBL may include an object group table in which an object ID is associated with a group representing characteristics or attributes of an object. FIG. 4 illustrates an example of the object state table OBS_ST_TBL.

The object state table OB_ST_TBL included in the object table includes, in an entry of an object ID old "bulldozer_4325" corresponding to a bulldozer of the real world, a plurality of state names ST_NM "speed" "latitude" and "longitude" that are internal states of the bulldozer, and state values ST_VL of the state names. For instance, when the event processing unit updates state values in the object state table OB_ST_TBL to state values of state names included in an event message, a plug-in PLG associated with the updated state is executed.

An object is an event generation source, and as a specific example, is a person or an object of the real world, e.g., a vehicle or an IoT terminal, and further a service. A state is a state of an object, and as a specific example, is a speed or a position (latitude and longitude) of a vehicle. A state value is a value of a state.

First Embodiment

Configuration Example of Event Stream System

Figure 5:
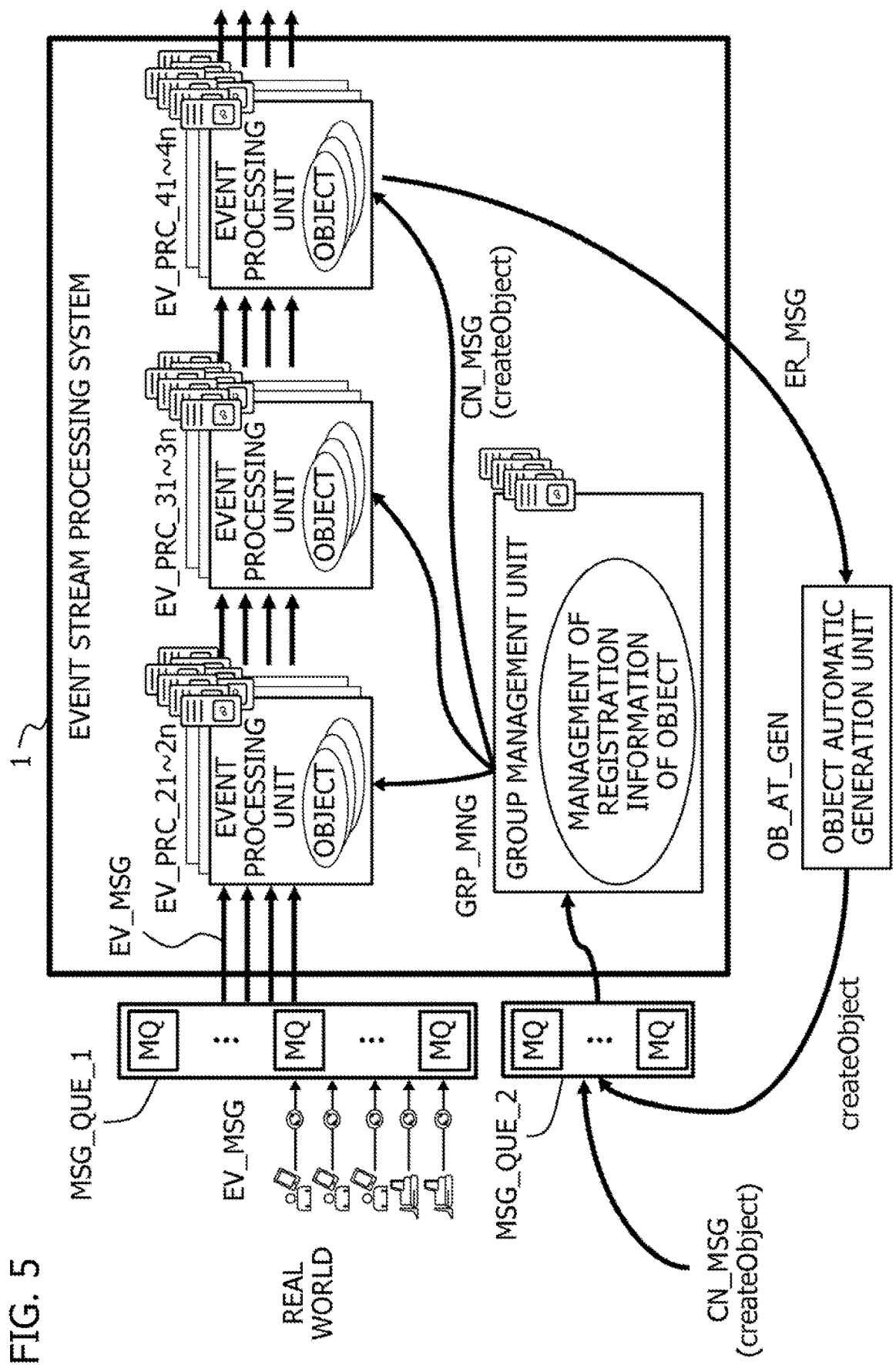
FIG. 5 is a diagram illustrating a configuration example of the event stream processing system in a first embodiment.

FIG. 5 is a diagram illustrating a configuration example of the event stream processing system in a first embodiment in the event stream processing system 1, a plurality of processor cores in a plurality of physical machines (nodes) generate a plurality of stages of event processing units EV_PRC_21 to 2n, EV_PRC_31 to 3n and EV_PRC_41 to 4n. The processor cores generate the respective event processing units EV_PRC by executing an event processing program included in an event stream processing program EV_PRC_PRG. The event processing units EV_PRC_21 to 2n and EV_PRC_31 to 3n correspond to event processing units and service event processing units illustrated in FIG. 2.

In the event stream processing system, a processor core of a physical machine further generates a group management unit GRP_MNG that performs global registration of a group representing characteristics, affiliation, attributes and the like of an object. The processor core generates the group management unit (or task) by executing a group management program included in the event stream processing program EV_PRC_PRG.

In the event stream processing system, first and second message queues MSG_QUE_1 and MSG_QUE_2 are provided. Event messages EV_MSG transmitted from objects, e.g., vehicles are queued in the first message queue MSG_QUE_1. In addition, control messages CN_MSG transmitted from a service manager and the like are queued in the second message queue MSG_QUE_2. A processor of the physical machine generates a message queue by executing a message queue program.

The first message queue MSG_QUE_1 transfers an event message EV_MSG queued therein to an event processing unit identified by an object ID and a stage number of the event message through an input processing unit in any task slot (not illustrated). FIG. 5 illustrates a plurality of event processing units with stage numbers 2-4 generated in a plurality of task slots. A plurality of event messages in an event are each allocated to event processing units identified by object IDs, hash values and stage numbers of the event messages and are distributed-stream-processed in real time.

The second message queue MSG_QUE_2 transfers a control message CN_MSG queued therein to event processing units EV_PRC through the group management unit GRP_MNG. When the control message is an object generation message CreateObject for creating a new object, for instance, the group management unit registers objects belonging to a group and transfers the object generation message to an event processing unit identified by a hash value of an object ID and a stage number included in the message. The event processing unit processes the transferred object generation message and generates an object table OB_TBL corresponding to the new object. As described above, the object table is associated with an event processing unit that processes an event of the object and stored in the data storage DATA_STRG.

In addition, an automatic object generation unit OB_AT_GEN is generated outside of physical machines of the event stream processing system 1. The automatic object generation unit issues an object generation message CreateObject for generating an unregistered object in response to an error message issued by an event processing unit when an object of a received event message is unregistered. This object generation message is processed by the group management unit and the event processing unit and an object table is newly registered. In addition, the event processing unit processes an updated state of the received event message.

Object Table, Plug-in Management Table, Group-Affiliated Object Table

Figure 6:
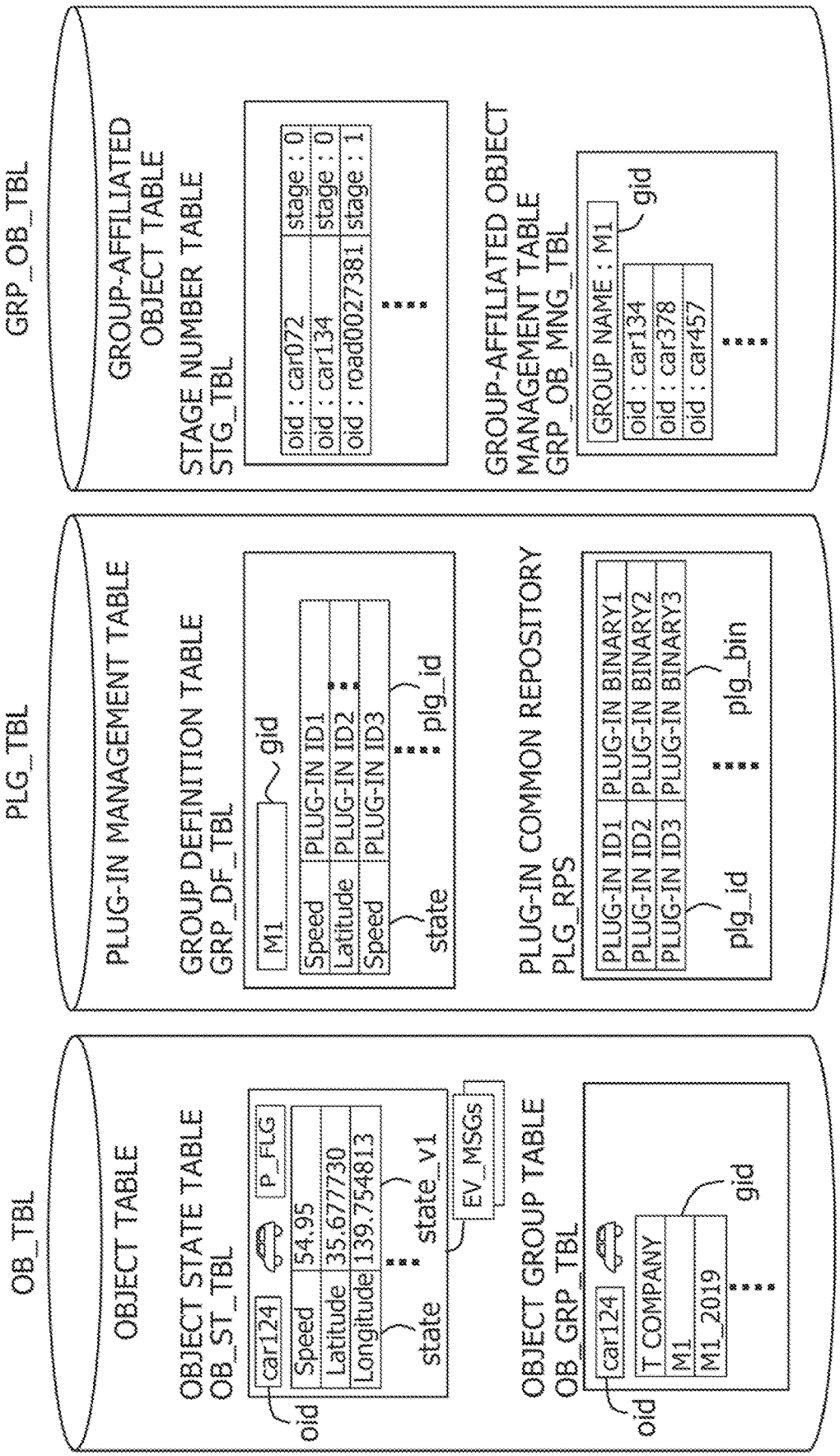
FIG. 6 is a diagram illustrating an example of an object table, a plug-in management table, and a group-affiliated object table.

FIG. 6 is a diagram illustrating an example of an object table, a plug-in management table, and a group-affiliated object table. The object table OB_TBL and the plug-in management table PLG_TBL are generated and managed by an event processing unit. The group-affiliated object table GRP_OB_TBL is generated and managed by the group management unit. As illustrated in FIG. 3, the object table OB_TBL is associated with an event processing unit that manages the object table and the plug-in management table PLG_TBL is commonly provided to all event processing units.

The object table OB_TBL includes an object state table OB_ST_TBL and an object group table OB_GRP_TBL. The object state table OB_ST_TBL includes a single or a plurality of types of state information (association of state names state and state values state_vl) in each table of an object ID old and also includes a provisional registration flag P_FLG. Further, the object group table OB_GRP_TBL includes a single or a plurality of group IDs gid in each table of an object ID oid. All group names, e.g., characteristics, attributes and affiliation of an object, are registered in each object group table.

The plug-in management table PLG_TBL includes a group definition table GRP_DF_TBL and a plug-in common repository PLG_RPS. The group definition table GRP_DF_TBL includes association of a single or a plurality of state names state with plug-in IDs plg_id in a table of a group ID gid. The plug-in common repository PGL_RPS includes association of a single or a plurality of plug-in IDs plg_id with plug-in binaries pig-bin. A plug-in binary is program code of a machine language that can be executed by a computer. In the case of an object-oriented program, the plug-in described in FIG. 3 is decoded to acquire a binary (class) and the binary is integrated into the object-oriented program and registered in the plug-in common repository.

As illustrated in FIG. 3, each table of the object table OB_TBL is associated with an object ID oid and stored in a data storage DATA_STRG in association with an event processing unit in charge of processing an event of the object corresponding to the object ID oid. Further, the group definition table and the plug-in common repository included in the plug-in management table PLG_TBL are stored in a data storage DATA_STRG commonly for a plurality of event processing units.

The event stream processing system executes event processing in an event-driven manner at a timing at which states of a plurality of objects including "things", e.g., objects, persons and services, are updated. In such a case, when an object is a certain vehicle "car124", the vehicle "car124" belongs to groups of various characteristics and the like, for instance, T company manufacture, model name M1, and 2019 model M1, and a state name and a state value in the object are present for each group. Further, a vehicle that is an object different from the vehicle "car124" may belong to the same group or groups as the vehicle "car124" or belong to different group or groups.

In this manner, states of all objects are different depending on groups to which they belong, but each group is commonly arranged in a plurality of objects. Accordingly, when states and plug-in IDs corresponding to the states of all groups to which each object belongs are associated with each object, the number of associations of states and plug-in IDs of each object increases. Accordingly, a great number of associations of states and plug-in IDs need to be registered when a new object is registered. Therefore, in the present embodiment, an object ID old and all groups to which the object corresponding to the object ID belongs are registered in the object group table, the plug-in management table is commonly generated for a plurality of objects, and associations of a group ID gid and all state names and plug-in IDs belonging to the group corresponding to the group ID are registered in the group definition table of the plug-in management table. Further, associations of all plug-in IDs and plug-in binaries are registered in the plug-in common repository. Accordingly, an object is associated with associations of state names and state values through a group. Consequently, the amount of data of an object table OB_TBL generated for a new object can be reduced.

The group-affiliated (or group-belonged) object table GRP_OB_TBL illustrated in FIG. 6 includes a stage number table STG_TBL and a group-affiliated object management table GRP_OB_MNG_TBL. Associations of all object IDs old and stage numbers stage are registered in the stage number table. In the group-affiliated object management table, all object IDs old belonging to a group corresponding to a group are registered in the table of the group ID gid. The group-affiliated object management table is a reverse lookup table of the object group table OB_GRP_TBL and is global registration information on groups.

Event Message, Control Message, and Error Message

FIG. 7 is a diagram illustrating an example of an event message and a control message. The event message EV_MSG includes association of a message ID mid, an object ID oid, a message type MSG_type "event", a stage number stage, an event time eventTime, a single or a plurality of state names state and stage values state_vl.

An object generation message CreateObject among control messages CN_MSG includes a message ID mid, an object ID old, a message type MSG_type "object generation", a stage number stage, and affiliated group group "car", "M1". In addition, a plug-in addition message AddPlugin among the control messages includes a message ID mid, an object ID old, a message type MSG_type "plug-in addition", a plug-in ID plug_id "plg_10", a corresponding state name state "speed" and a plug-in code plg_cd "yv66vgAADhoge . . . ". Further, an error message ER_MSG includes a message ID mid, an object ID oid, and a stage number stage.

Overview of Object Registration and Event Processing

Figure 8:
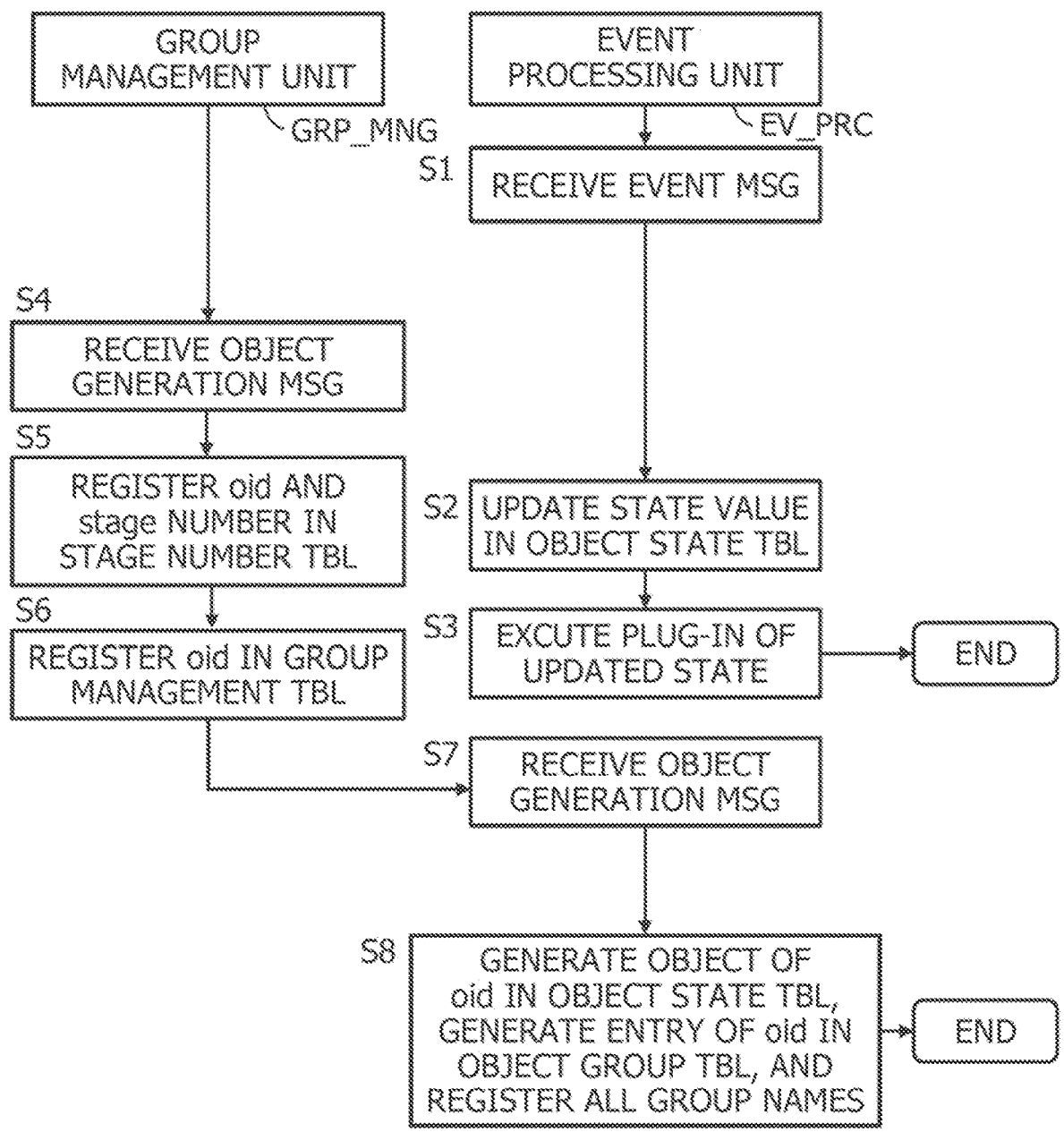
FIG. 8 is a flowchart illustrating an example of processing an object generation message and an event message of an event processing unit.

FIG. 8 is a flowchart illustrating an example of processing an object generation message and an event message of an event processing unit. When an object generation message CreateObject is received (S4), the group management unit GRP_MNG registers an object ID old and a stage number of the message in the stage number table (S5) and registers the object ID old in the group management table (the group-affiliated object management table GRP_OB_MNG_TBLE) (S6). Then, the object generation message is transferred to an event processing unit EV_PRC identified by the object ID oid and the stage number stage in the message. The event processing unit receives the object generation message (S7), generates a table of the object ID oid in an object state table OB_ST_TBL of the object table OB_TBL, generates an entry (a table) of the object ID oid in the object group table OB_GRP_TBL and registers all groups in the message in the table (S8).

After the two tables of the object are registered in the event processing unit as described above, the event processing unit receives an event message from the object through a message queue (S1). The event processing unit detects an object state table OB_ST_TBL conforming to (or matched) an object ID oid of the event message and updates a state value in the object state table to a state value in the event message (S2). Then, the event processing unit executes a plug-in corresponding to the updated state value in the group definition table GRP_DF_TBL with respect to all groups of the object group table OB_GRP_TBL which are conforming to the object ID oid (S3). A plug-in binary is acquired from the plug-in common repository.

As described above, the object generation message is initially issued, and the event processing unit in charge of object processing registers the object table in advance in response to the object generation message. Thereafter, the event processing unit updates the state value of the state in the object table already registered in response to the event message and executes the plug-in with respect to the updated state value.

Overview: Event Processing of Unregistered Object

Meanwhile, in the present embodiment, the event stream processing system minimizes the influence on stream processing, automatically generates an object table and executes a plug-in with respect to an updated state value in an event message, as will be described below, even when the event message is received in a state in which an object table is not registered.

Figure 9:
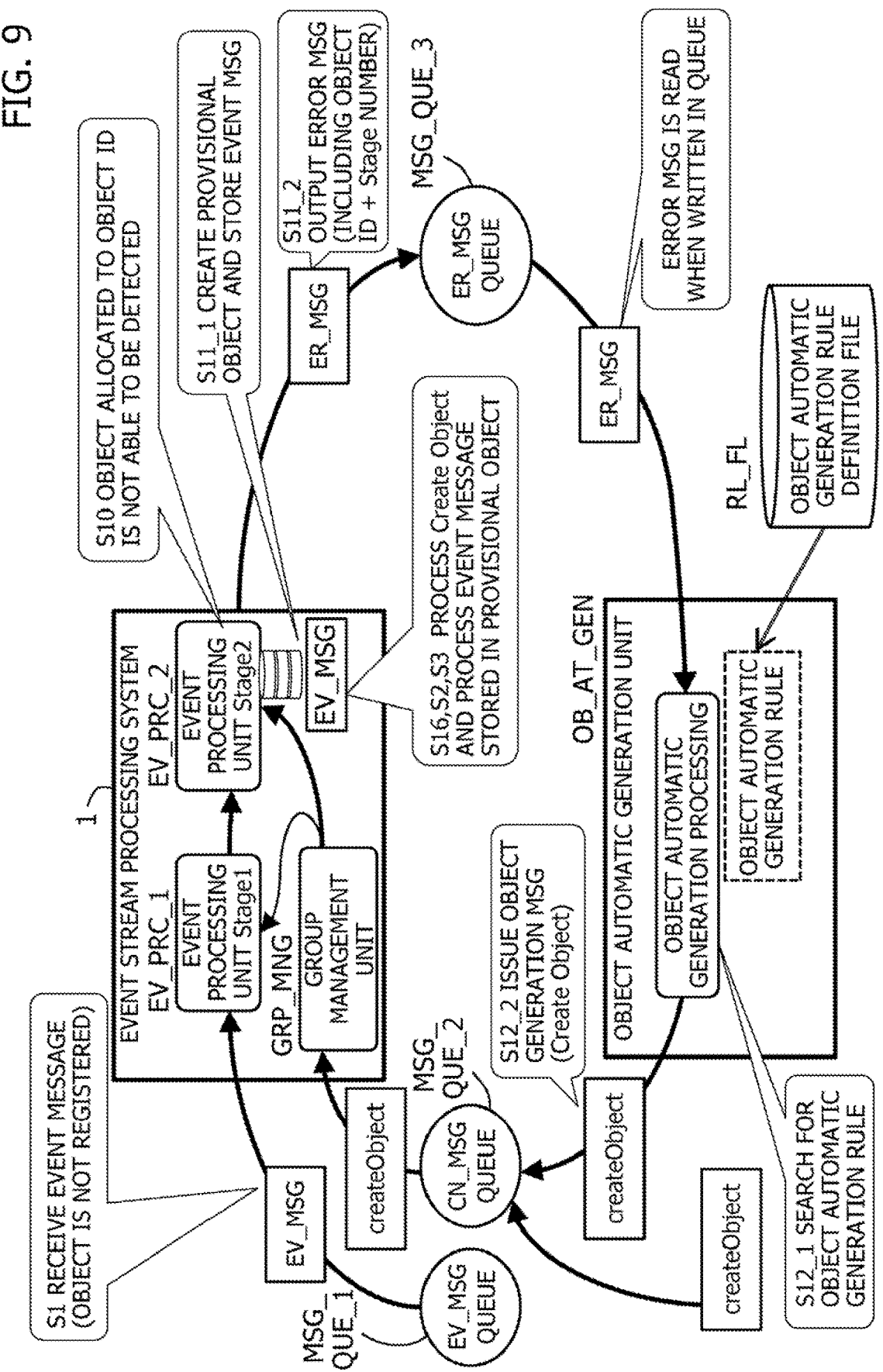
FIG. 9 is a diagram illustrating an overview of processing with respect to an event message for an unregistered event in the event stream processing system.
Figure 10:
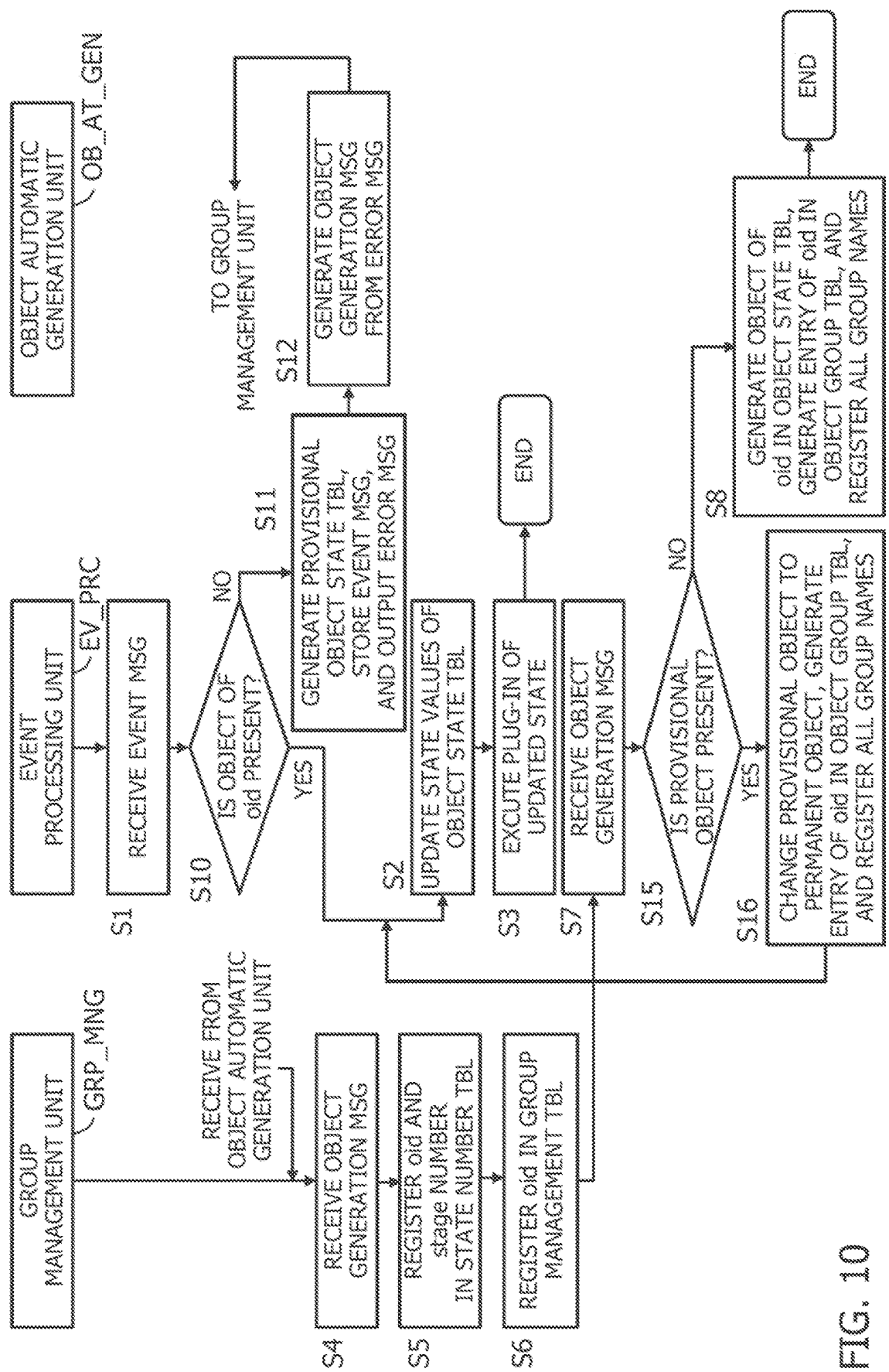
FIG. 10 is a diagram illustrating a flowchart of the processing with respect to an event message for an unregistered event in the event stream processing system.

FIG. 9 is a diagram illustrating an overview of processing with respect to an event message for an unregistered event in the event stream processing system. FIG. 10 is a diagram illustrating a flowchart of the processing with respect to an event message for an unregistered event in the event stream processing system. The same processing as that in FIG. 8 is denoted by the same reference number. An overview of the processing of an event message for an unregistered event will be described with reference to FIGS. 9 and 10.

1. Event Message Arrives at Event Processing Unit

An event message arrives through the event message queue MSG_QUE_1, and an event processing unit identified by an object ID oid and a stage number of the event message receives the event message (S1). Although the event processing unit searches object state tables OB_ST_TBL of object tables OB_TBL, an object table OB_TBL of the object ID oid is not registered and thus is not detected (NO in S10).

Accordingly, the event processing unit creates a provisional object (provisional object state table OB_ST_TBL) In an object table OB_TBL and stores the event message in association with the provisional object (S11_1). Here, state names and state values other than the object ID oid are not registered in the provisional object state table. Further, the event processing unit issues an error message ER_MSG (including an object ID old and a stage number stage) (S11_2). The error message is queued in an error message queue MSG_QUE_3.

2. Automatic Object Generation Unit Issues Object Generation Message

The automatic object generation unit OB_AT_GEN reads the error message ER_MSG, analyzes the object ID oid and the stage number stage in the error message based on an object automatic generation rule definition file RL_FL and extracts a group corresponding to a rule matching the object ID and the stage number (S12_1). Then, the automatic object generation unit issues an object generation message CreateObject (including oid, a stage number and a group name) (S12_2). The object generation message is queued in the control message queue MSG_QUE_2.

3. Group Management Unit Processes Object Generation Message and Registers Object The group management unit GRP_MNG receives the object generation message CreateObject (S4), registers association of the object ID oid and the stage number stage in a stage number table STG_TBL (S5), and registers the object ID old in entries of all groups in a group-affiliated object management table GRP_OB_MNG_TBL (S6). Then, the object generation message is transferred to the event processing unit. The event processing unit that is a transfer destination is identified by a hash value of the object ID oid and the stage number stage included in the message.

4. Event Processing Unit Processes Object Generation Message and Registers Object The event processing unit receives the object generation message CreateObject (S7), searches the object table OB_TBL, and detects a provisional object (provisional object state table) conforming to (or matching) the object ID old of the object generation message (YES in 515). The event processing unit creates a permanent object (permanent object state table O_ST_TBL) from the provisional object (provisional object state table) or changes the provisional object to the permanent object, creates an entry of the object ID oid in the object group table OB_GRP_TBL, and registers all group names in the object generation message (S16).

5. Event Processing Unit Processes Event Message Held Thereby and Executes Plug-in Further, the event processing unit performs event message processing (S2 and S3) with respect to all event messages which have been received at the time of provisional object registration and thereafter and stored in association with the provisional object. That is, the event processing unit updates state values with respect to state names in the object state table OB_ST_TBL which are conforming to object IDs oid of event messages to state values of a held event message (S2). Then, the event processing unit acquires a group of the object IDs old from the object group table OB_GRP_TBL and executes a plug-in corresponding to the updated state values from among states registered in the acquired group with reference to the plug-in management table PGL_TBL (S3).

6. Provisional Object Is Deleted If Object Automatic Generation Has Failed

Meanwhile, although not illustrated in FIGS. 9 and 10, when the automatic object generation unit does not generate the object generation message because a rule matching the object ID oid of the error message is not discovered, or the like, a provisional object deletion message FlushGhost is generated and issued. This message is queued in the control message queue MSG_QUE_2. In response to this, the event processing unit executes the provisional object deletion message FlushGhost, deletes the provisional object (provisional object state table) and also deletes the held event message.

Detailed Description: Event Processing of Unregistered Object

Next, event processing of an unregistered object will be described in detail. With respect to a case in which an event message to an unregistered object is received, event processing for the event message, processing for a control message by the event processing unit, and processing for a control message by the group management unit will be described.

Event Processing for Event Message by Event Processing Unit

Figure 11:
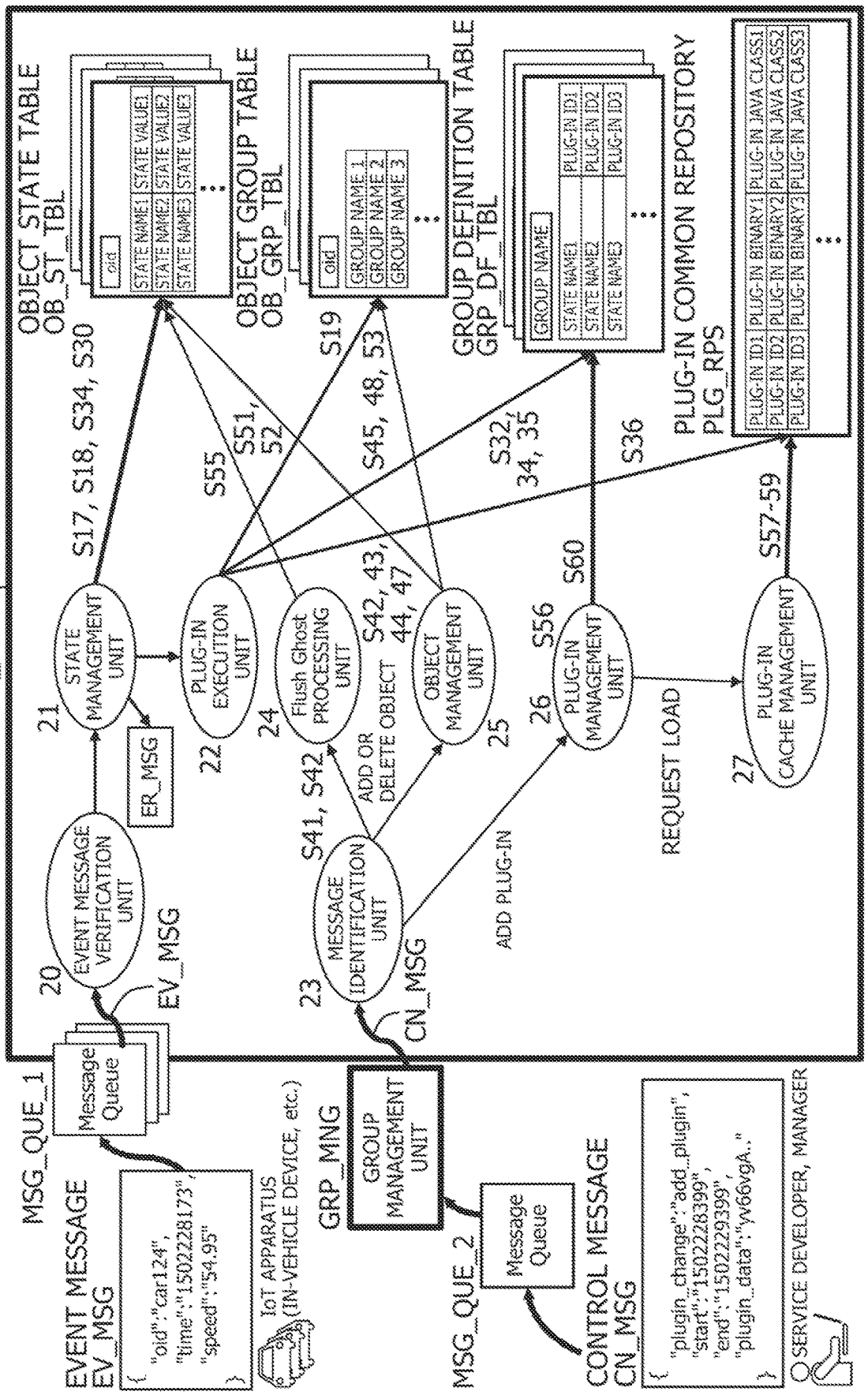
FIG. 11 is a block diagram illustrating a relationship of various types of processing in the event processing unit.

FIG. 11 is a block diagram illustrating a relationship of various types of processing in the event processing unit. FIG. 11 illustrates object tables (object state tables OB_ST_TBL and object group tables OB_GRP_TBL) and plug-in management tables (group definition table GRP_DF_TBL and plug-in common repository PLG_RPS) managed by the event processing unit EV_PRC. The event processing unit includes an event message verification unit 20, a state management unit 21, and a plug-in execution unit 22 which process event messages input from the first message queue MSG_QUE_1. In addition, the event processing unit includes a message identification unit 23, a flush ghost processing unit 24, an object management unit 25, a plug-in management unit 26, and a plug-in cache management unit 27 which process control messages CN_MSG input from the second message queue MSG_QUE_2 through the group management unit GRP_MNG. Details of processing of each unit will be described using flowcharts of FIGS. 12 to 15.

Figure 12:
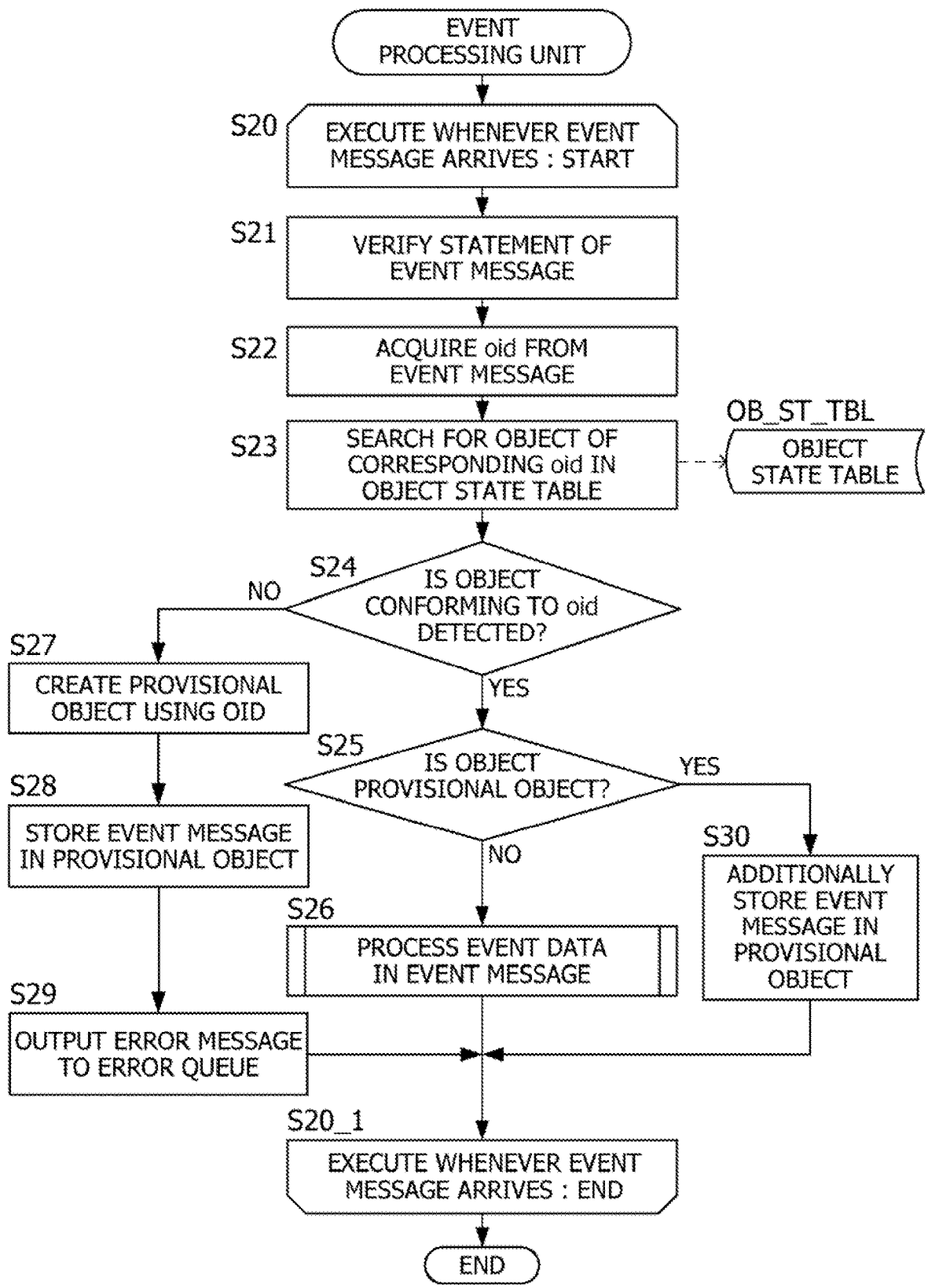
FIG. 12 is a flowchart of event message processing by the event processing unit.

FIG. 12 is a flowchart of event message processing by the event processing unit. The event processing unit repeats the following processing whenever an event message arrives (S20 to S20_1). The event processing unit verifies statement of an event message received from the first message queue MSG_QUE_1 (S21). This processing is executed by the event message verification unit 20 in FIG. 11. When description of the event message is appropriate, the event processing unit acquires an object ID oid from the event message (S22) and searches the object state tables OB_ST_TBL for an object table conforming to the acquired object ID oid (S23). This processing is performed by the state management unit 21 in FIG. 11. Accordingly, the event processing unit detects whether the object of the event message has already been registered.

When an object (object state table) conforming to the object ID oid is detected (YES in S24), the event processing unit executes processing of event data (updated state values) in the event message (S26) if the detected object is not a provisional object (NO in S25). This processing is performed by the state management unit 21 and the plug-in execution unit 22 in FIG. 11. This event data processing S26 will be described in FIG. 13.

On the other hand, when the object of the object ID oid of the event message has not been registered (NO in S24), the event processing unit is not able to detect an object state table conforming to the object ID oid. In this case, the event processing unit generates a provisional object (provisional object state table) using the acquired object ID oid (S27) and stores the event message in the generated provisional object (S28). Then, the event processing unit issues an error message ER_MSG (S29). This processing S27 to S29 is executed by the state management unit 21 in FIG. 11. The error message ER_MSG includes the object ID oid and the stage number stage in the event message.

In addition, when a table conforming to the object ID oid is a provisional object (provisional object state table) (YES in S25), the event processing unit saves and stores the event message in the provisional object (provisional object state table) (S30). This is for the purpose of temporarily holding an event message to the unregistered object which arrives after provisional object generation and processing the held event message after the provisional object is changed to a permanent object.

Object Generation and Issuance by Automatic Object Generation Unit

As described with reference to FIGS. 9 and 10, the object ID old and the stage stage of the error message ER_MSG issued by the event processing unit are analyzed by the automatic object generation unit OB_AT_GEN. The automatic object generation unit OB_AT_GEN searches for a rule matching the object ID oid or searches for a rule matching the object ID old and the stage stage with reference to the object automatic generation rule definition file RL_FL.

Figure 19:
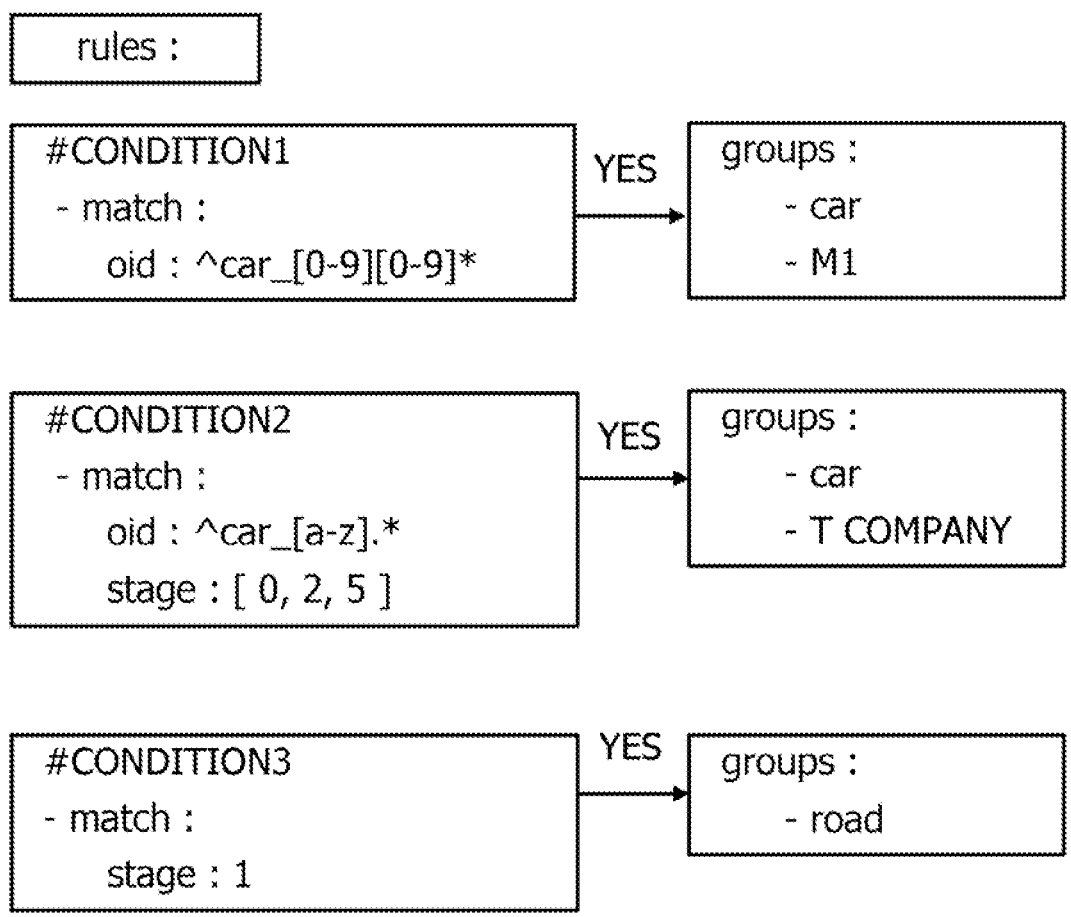
FIG. 19 is a diagram illustrating an example of object automatic generation rules.

FIG. 19 is a diagram illustrating an example of object automatic generation rules. FIG. 19 illustrates three rules and conditions of each rule are described by a regular expression that expresses a set of character strings as a single character string. Condition 1 is (1) that an object ID old is any figure of 0 to 9 ([0-9]) and 0 times or more (*) of any figure of 0 to 9 ([0-9]) after "car_" and (2) a stage is an arbitrary stage. An example of a character string of a matching oid is "car_2456". When an object ID old matches this condition, a group is "car" and car model 1 "M1". Condition 2 is (1) that an object ID oid is one any letter ([a-z]) and 0 times or more (*) repetition of an arbitrary character (.) after "car_" and (2) a stage is stage 0, 2 or 5. An example of a character string of a matching oid is "car_ih34fg". When an object ID old matches this condition, a group is "car" and car maker 1 "T company". Condition 3 is (1) that an object ID oid is arbitrary and (2) a stage is 1. When old matches this condition, a group is road "road".

When the automatic object generation unit OB_AT_GEN detects an object group from the object ID oid and the stage number stage of the error message, the automatic object generation unit OB_AT_GEN issues an object generation message CreateObject. As illustrated in FIG. 5, this object generation message is temporarily queued in the second message queue MSG_QUE_2.

Next, processing of the group management unit that initially processes the object generation message issued by the automatic object generation unit (FIGS. 16, 17 and 18) will be described, and then processing of a control object including the object generation message (FIGS. 11, 14 and 15) and processing of event data (FIGS. 11 and 13) by the event processing unit will be described.

Figure 16:
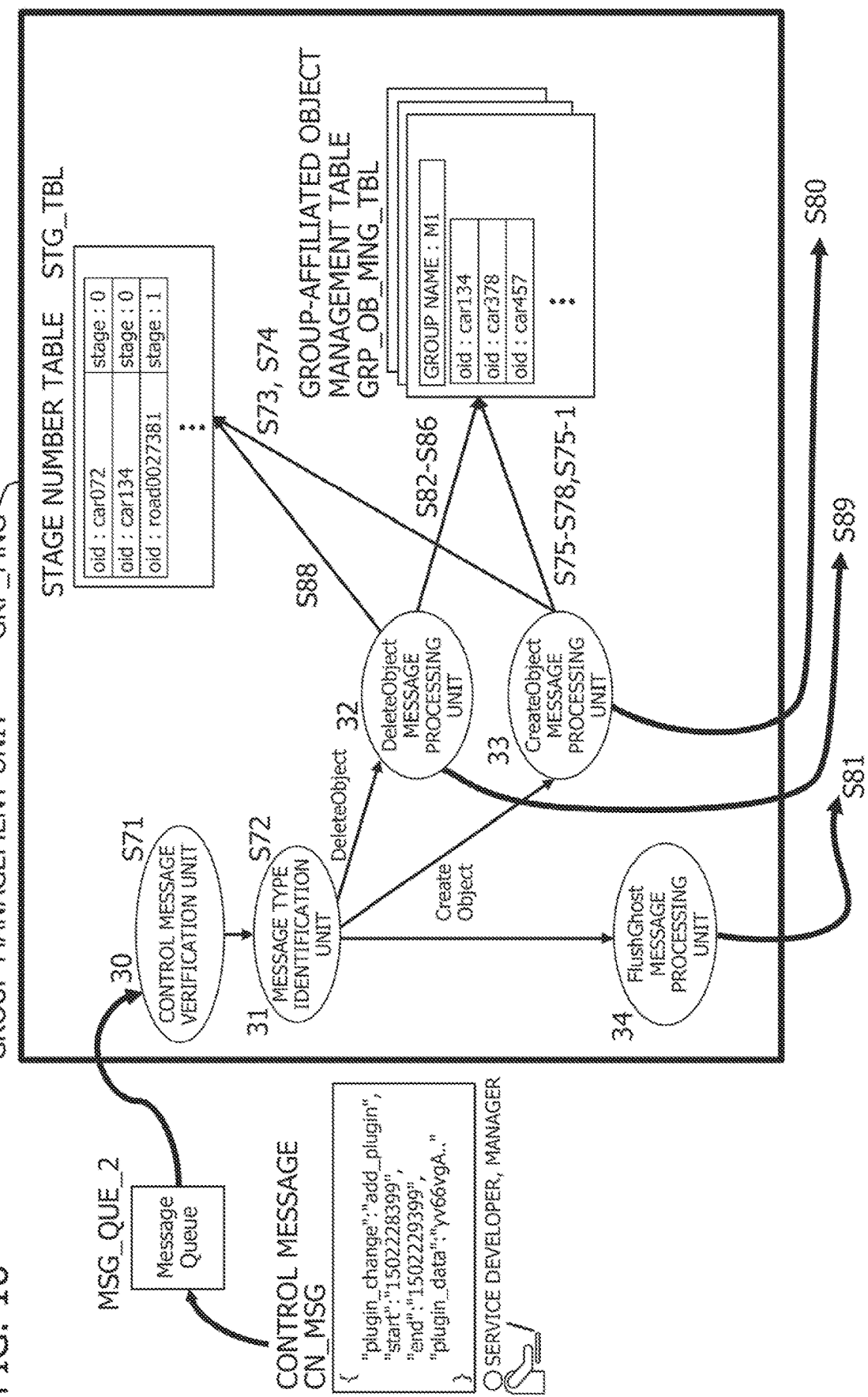
FIG. 16 is a block diagram illustrating relationships of various processors of the group management unit.
Figure 17:
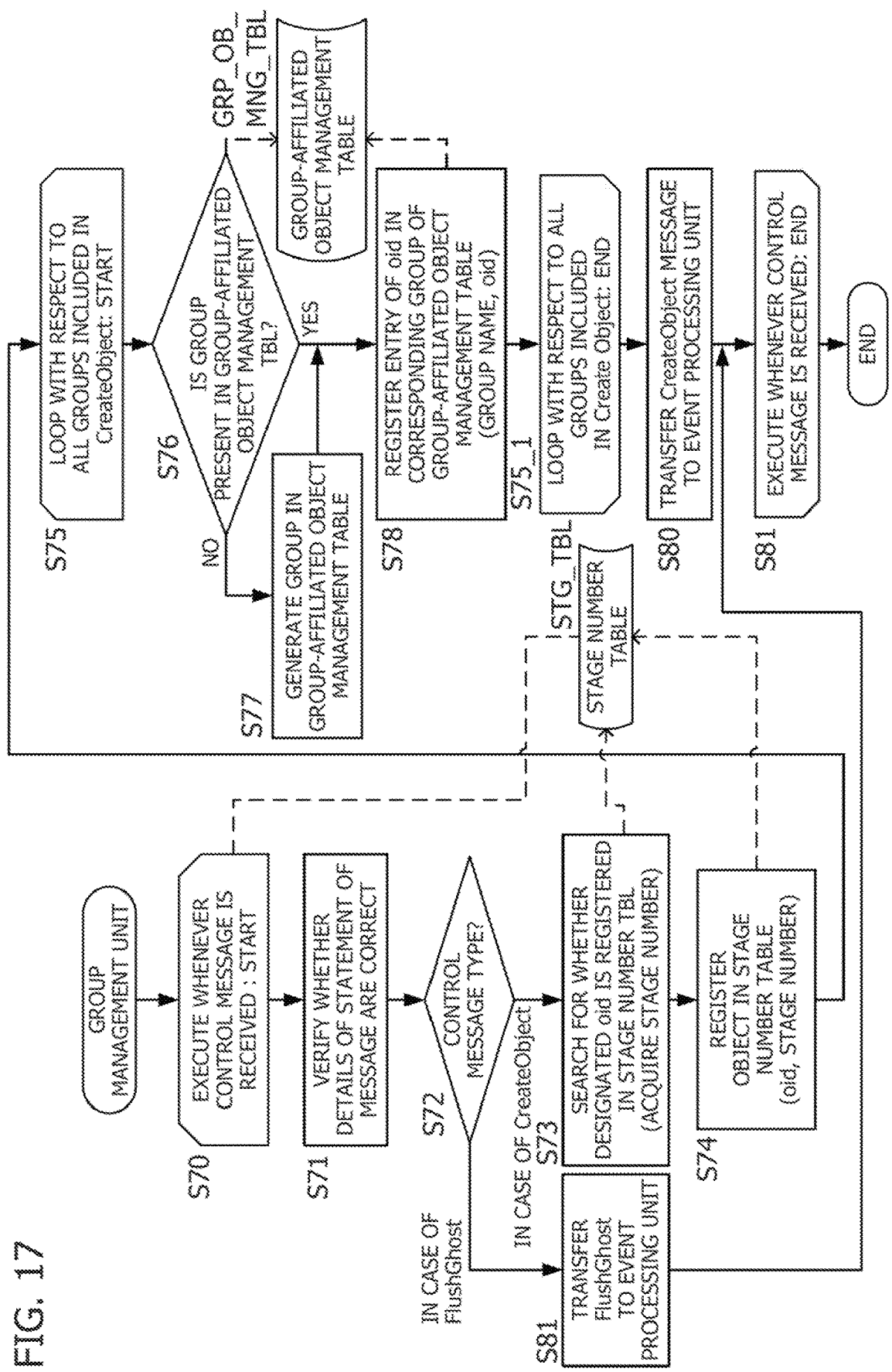
FIG. 17 is a diagram illustrating flowcharts of processing of the group management unit.
Figure 18:
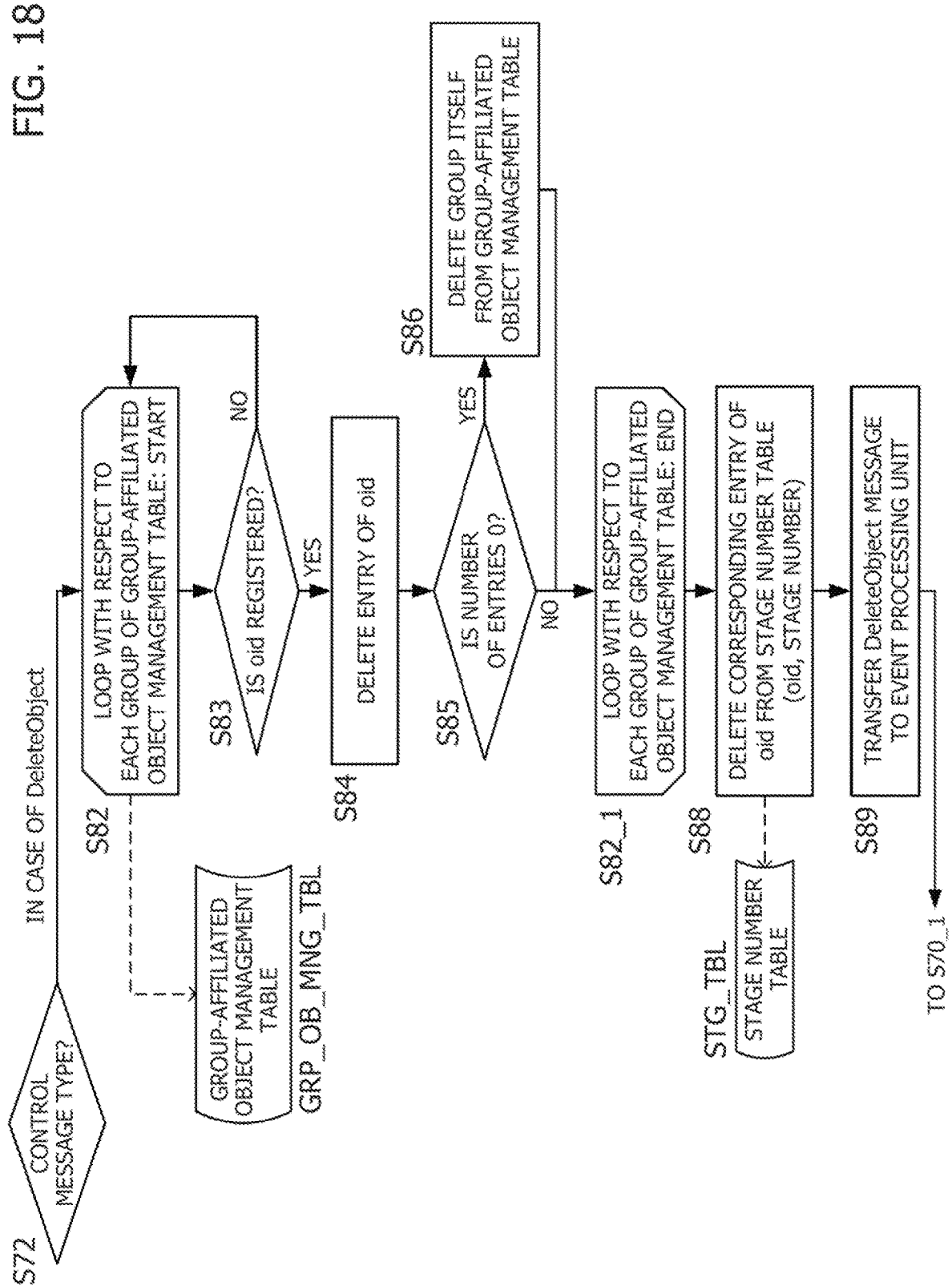
FIG. 18 is a diagram illustrating flowcharts of processing of the group management unit.

Processing of Control Message by Group Management Unit (FIGS. 16, 17 and 18)

FIG. 16 is a block diagram illustrating relationships of various type of processings of the group management unit. FIG. 16 illustrates group-affiliated object tables GRP_OB_TBL (stage number table STG_TBL and group-affiliated object management tables GRP_OB_MNG_TBL) managed by the group management unit GRP_MNG. As illustrated in FIG. 1, the processor 10 executes the group management program and generates the group management unit GRP_MNG in the event stream processing system commonly for a plurality of event processing units.

The group management unit globally processes a control message input from the second message queue MSG_QUE_2 of control messages and transfers the control message to an event processing unit identified by an object ID and a stage number. The group management unit includes a control message verification unit 30, a message type identification unit 31, an object deletion message processing unit 32, an object generation message processing unit 33, and a flush ghost message processing unit 34. Details of processing of these processing units will be described using flowcharts of FIGS. 17 and 18.

FIGS. 17 and 18 are diagrams illustrating flowcharts of processing of the group management unit. The group management unit GRP_MNG repeatedly executes the following processing whenever a control message is received (S70 to S81). Here, processing of an object generation message CreateObject, an object deletion message DeleteObject, and a flush ghost message FlushGhost will be described.

As illustrated in FIG. 17, the group management unit verifies whether details of statement of a received control message are correct (S71). This processing is performed by the control message verification unit 30. When the details of the statement of the received control message are correct, the group management unit identifies the type of the control message (S72). This processing is performed by the message type identification unit 31.

When the type is the object generation message CreateObject, the group management unit searches the stage number table STG_TBL, checks whether the object ID old of the object generation message has been registered (S73), and registers association of the object ID oid and the stage number stage in the object generation message in the stage number table when the object ID old has not been registered (S74). This processing S73 and S74 is executed by the object generation message processing unit 33.

Although not illustrated in FIG. 17, the group management unit may issue a flush ghost message (provisional object deletion message) for deleting a provisional object of the event processing unit when the object ID oid of the object generation message has been registered in the stage number table STG_TBL. This is because a manager is likely to issue the object generation message in order to generate an unregistered object prior to the object generation message CreateObject issued after generation of a provisional object state table for an event message of the unregistered object. In this case, the provisional object deletion message FlushGhost is generated to delete the provisional object.

Then, the object management unit repeatedly executes the following processing with respect to all groups in the object generation message with reference to the group-affiliated object management tables GRP_OB_MNG_TBL (S75 to S75_1). This processing is executed by the object generation message processing unit 33. The object management unit generates a group table in the group-affiliated object management tables (S77) when a group in the message is not present in the group-affiliated object management table (NO in S76). In a case in which the group is present and a case in which the group is not present but generated (YES and NO in S76), the object ID oid in the message is registered in the corresponding group table of the group-affiliated object management tables (S78). In this manner, global object registration is completed. Accordingly, the object management unit transfers the object generation message to the event processing unit (S80).

As Illustrated in FIG. 18, when the type of the control message is the object deletion message DeleteObject, the group management unit repeatedly executes the following processing with respect to each group in the table with reference to the group-affiliated object management tables GRP_OB_MNG_TBL (S82 to S82_1). This processing is executed by the object deletion message processing unit 32. The object management unit checks whether the object ID old of the message is being registered in the table of each group (S83) and deletes the entry of the object ID old from the table of each group (S84) If the object ID old is being registered (YES in S83). If the entry in the table of each group becomes 0 as a result of deletion of old (YES in S85), the group management unit deletes the table of the group from the group-affiliated object management tables (S86).

Further, the group management unit deletes the entry of the object ID old in the message from the stage number table STG_TBL (S88) and transfers the object deletion message to the event processing unit (S89). This processing is executed by the object deletion message processing unit 32.

As Illustrated in FIG. 17, when the received control message is a flush ghost message FlushGhost (S72), the group management unit transfers the message to the event processing unit (S81). This processing is performed by the flush ghost message processing unit 34.

Figure 14:
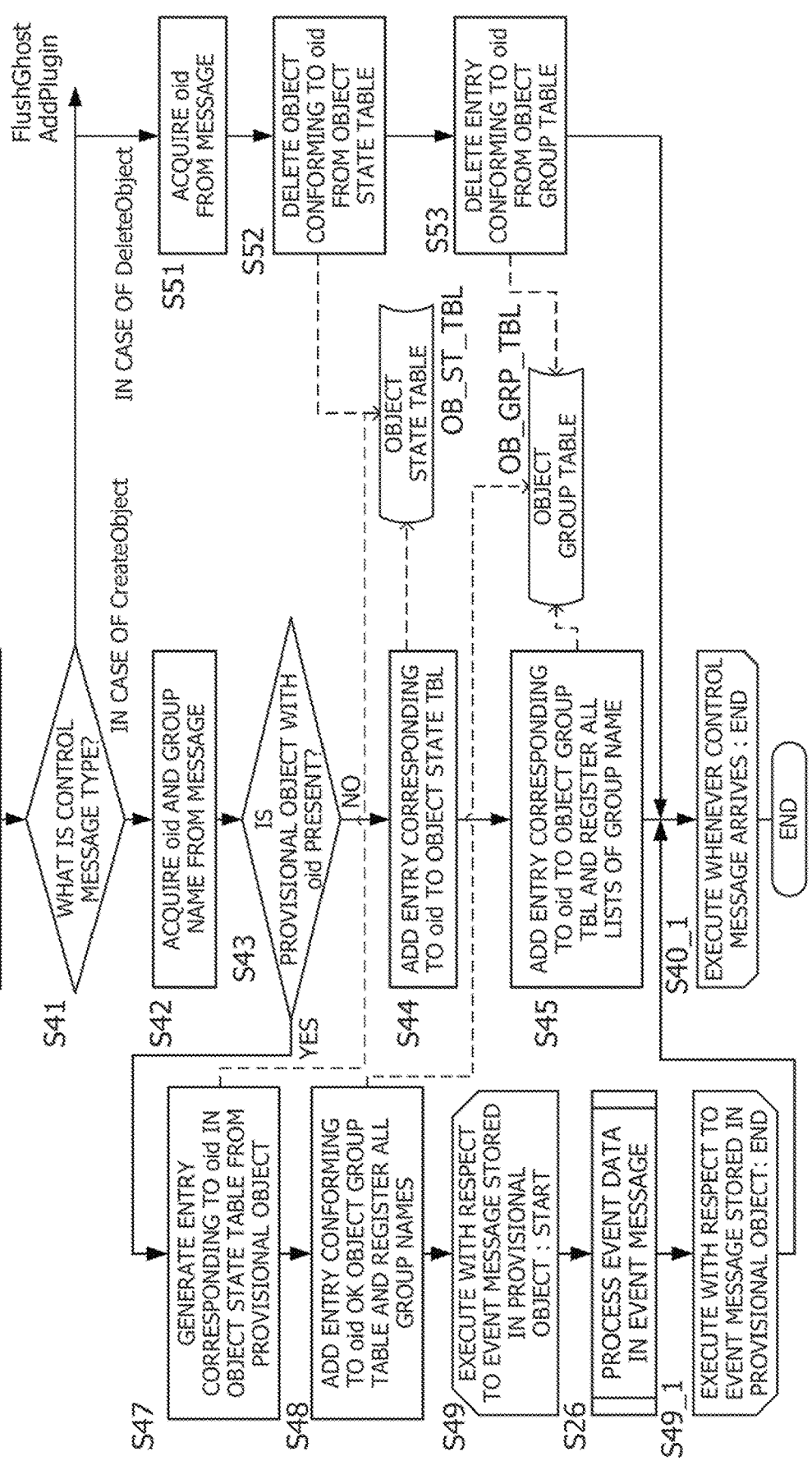
FIG. 14 is a flowchart of processing of a control object including an object generation message by the event processing unit.
Figure 15:
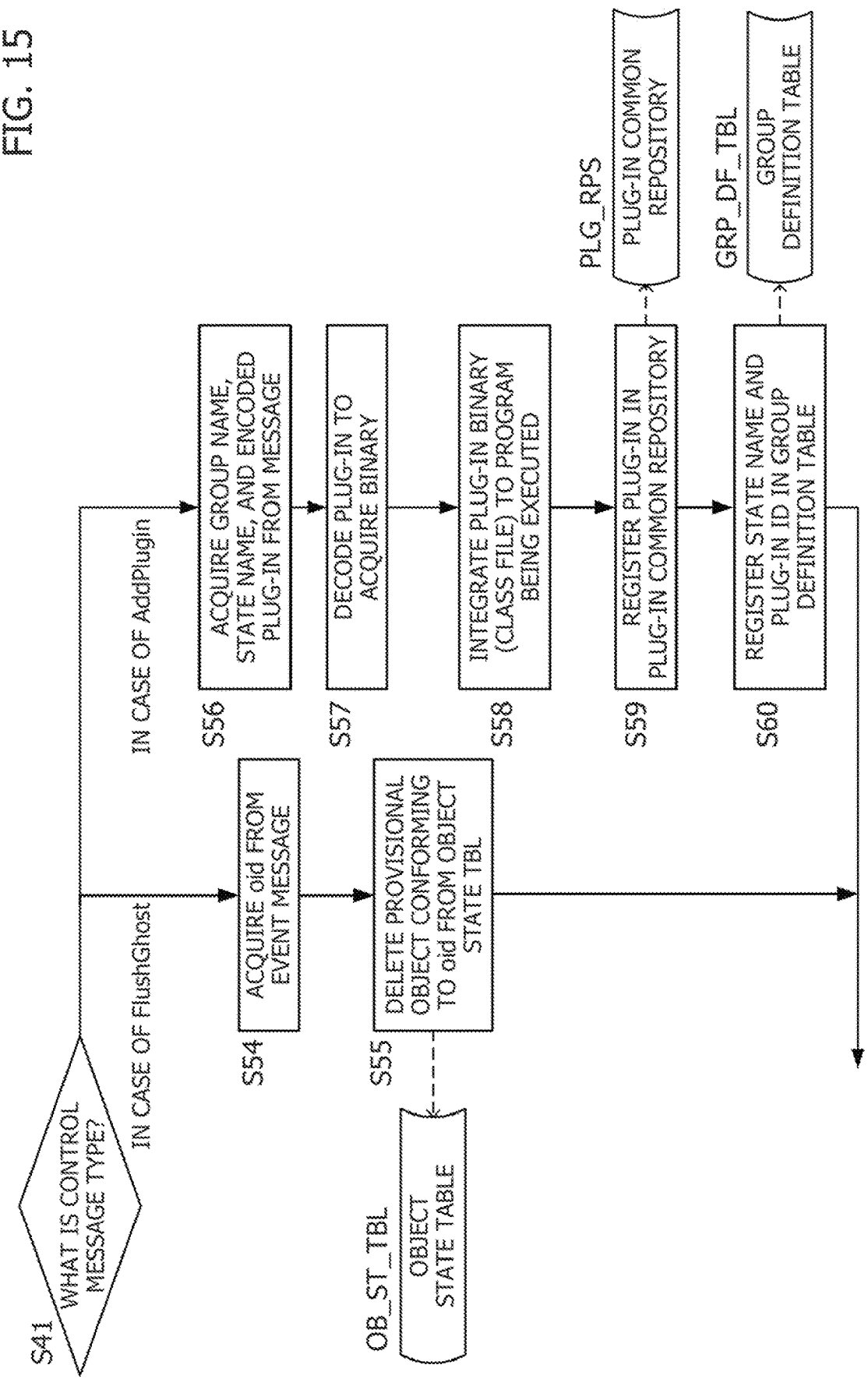
FIG. 15 is a flowchart of processing of a control object including an object generation message by the event processing unit.

Processing of Control Object Including Object Generation Message by Event Processing Unit (FIGS. 11, 14 and 15)

The object generation message CreateObject generated by the automatic object generation unit is transferred to the event processing unit through the group management unit GRP_MNG. As described above, the event processing unit that is a transfer destination is identified by the object ID old and the stage number stage in the message. Hereinafter, control message processing by the event processing unit will be described.

FIGS. 14 and 15 are flowcharts of processing of a control object including an object generation message by the event processing unit. FIG. 14 illustrates processing of an object generation message CreateObject and an object deletion message DeleteObject and FIG. 15 illustrates processing of a plug-in addition message AddPlugin and a flush ghost message RushGhost.

In FIG. 14, the event processing unit EV_PRC repeatedly executes the following processing S41 to S60 whenever a control message arrives (S40 and S40_1). The event processing unit identifies the type of a received control message (S41). Processing S41 is executed by the message identification unit 23. In the case of the object generation message CreateObject, the event processing unit acquires an object ID old and a group name from the message (S42) and checks whether a provisional object (provisional object state table OB_ST_TBL) matching the object ID old is present (S43).

When the provisional object is present (YES in S43), the event processing unit generates a permanent object (permanent object state table) from the provisional object (provisional object state table) (S47). This processing may be processing of nullifying a provisional flag of the provisional object to change the provisional object to the permanent object. Further, the event processing unit adds an entry conforming to the object ID old to object group tables OB_GRP_TBL and adds all groups in the message to the entry (S48). Then, the event processing unit repeats execution of processing S26 of event data of a held event message stored in association with the provisional object (provisional object state table) (S49, S26 and S49_1).

When the provisional object is not present (NO in S43), the event processing unit adds the table of the object ID old in the message to object state tables (S44), further adds the same old table to the object group tables, and registers all groups in the message to the table (S45). The aforementioned processing S42 to S49_1 is executed by the object management unit 25 and processing S26 of the event data of the event message is executed by the state management unit 21 and the plug-in execution unit 22.

Here, when the control message is the object deletion message DeleteObject, the event processing unit acquires an object ID old from the message (S51), deletes a table conforming to oid from the object state tables (S52), and deletes a table conforming to oid from the object group tables (S53). This processing is executed by the object management unit 25.

In FIG. 15, when the control message is the plug-in addition message AddPlugin, the event processing unit acquires a group name, a state name, and an encoded plug-in from the message (S56), decodes the plug-in to acquire a plug-in binary (class) (S57), integrates the plug-in binary into a program being executed (S58), and registers the plug-in binary in the plug-in common repository PRG_RPS (S59). Further, the event processing unit registers association of the state name and a plug-in ID in a group definition table GRP_DF_TBL conforming to the group name (S60). The aforementioned processing S56 to S60 is executed by the plug-in management unit 26 and the plug-in cache management unit 27.

When the control message is the flush ghost FlushGhost, the event processing unit acquires an object ID old from the message (S54) and deletes a provisional object state table conforming to oid from the object state tables (S55). The flush ghost FlushGhost is a message that is issued when the automatic object generation unit is not able to generate the object generation message and is used to delete a provisional object generated for an event message of an unregistered object. In this case, processing of a pending event message stored in association with the provisional object is not performed. Accordingly, accumulation of unprocessed provisional objects in the event processing unit is avoided.

Figure 13:
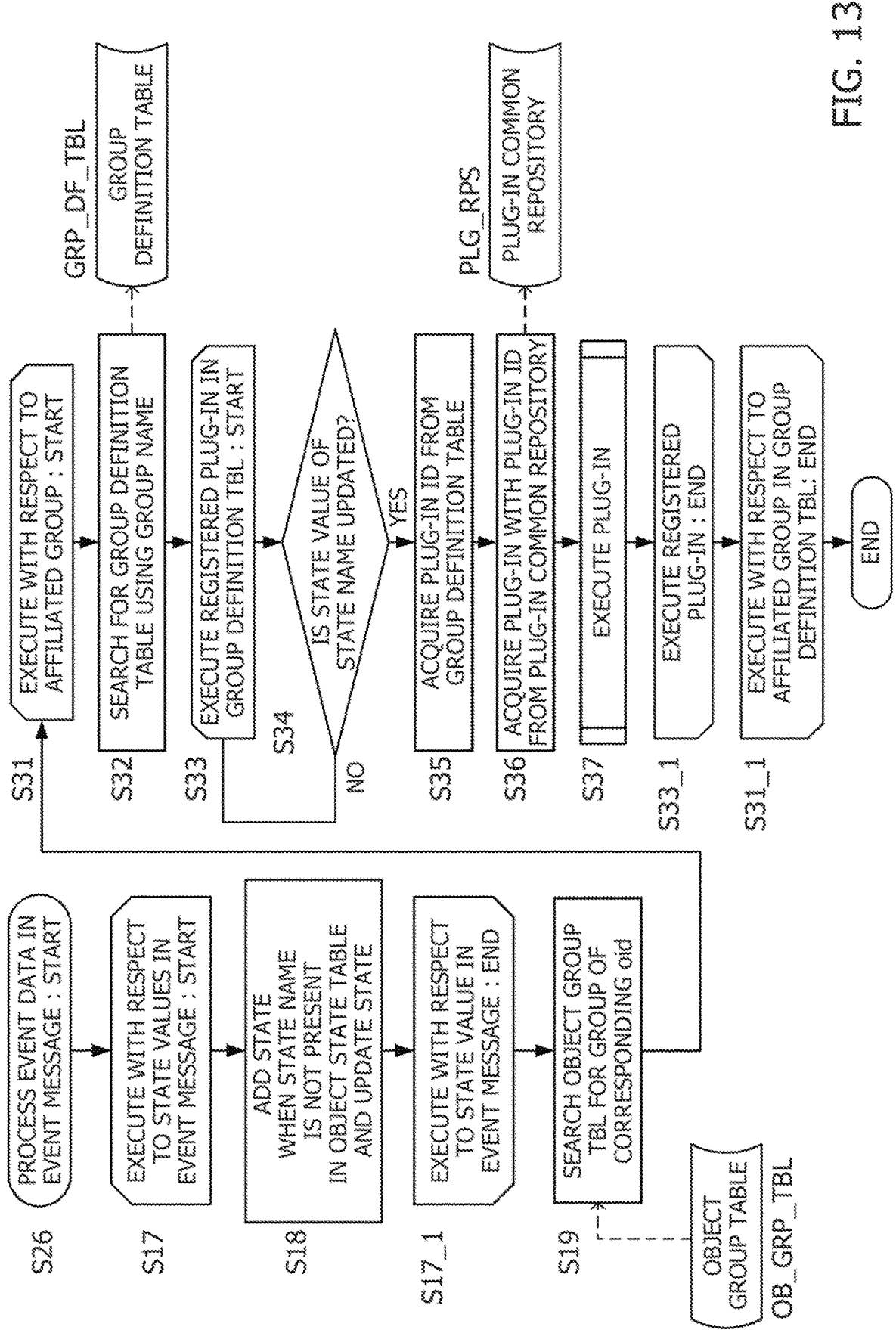
FIG. 13 is a flowchart of processing of event data by the event processing unit.

Processing of Event Data by Event Processing Unit (FIGS. 11 and 13)

FIG. 13 is a flowchart of processing of event data by the event processing unit. The event processing unit (1) adds a state name of a message when the state name is not present in object state tables and (2) updates state values in the object state tables OB_ST_TBL to state values in the event message (S18). The processing (1) of adding the state name is performed in a case in which the state name has not been yet registered in a permanent object state table and a case in which the unregistered state name is included in the event message when a provisional object state table has been changed to the permanent object state table. The event processing unit repeatedly executes the processing S18 with respect to the state values in the event message (S17 and S17_1). This processing S17, S18 and S17_1 is executed by the state management unit 21 in FIG. 11.

Then the event processing unit extracts a group name from an object group table OB_GRP_TBL conforming to an object ID old in the event message (S19). Further, the event processing unit repeats the following processing with respect to extracted each group belonging to the object of the object ID oid (S31 to S31_1). The event processing unit searches group definition tables GRP_DF_TBL using the group name (S32) and repeatedly executes a plug-in corresponding to the updated state name being registered in the group definition table conforming to the group name (S33 to S33_1). That is, the event processing unit extracts a plug-in ID corresponding to the updated state from the group definition table (S35) when the state values of the state name being registered have been updated (YES in S34). Then, the event processing unit acquires a plug-in binary (or plug-in class) corresponding to the extracted plug-in ID from the plug-in common repository (S36) and executes the plug-in (S37). The aforementioned processing S19 and S32 to S37 is executed by the plug-in execution unit 22.

According to the above-described present embodiment, objects, states of the objects, and groups of the objects are managed through object state tables and object group tables of object tables OB_TBL, and association relationships between groups, and states and plug-ins are managed through group definition tables. In addition, when an object is newly registered, an object table (object state table and object group table) of an object ID oid is registered. Meanwhile, when an event object with respect to an unregistered object is received, the event processing unit generates a provisional object state table, issues an error message, and stores and holds event messages in association with the provisional object state table. Then, an object generation message is automatically generated, the event processing unit changes the provisional object to a permanent object and processes the held event messages in response to the object generation message.

As described above, by processing event messages based on an automatically generated object (object table), it is possible to process transmitted event messages without omission even when objects are not registered in advance. In addition, unprocessing of a transmitted event message due to an unregistered object is avoided.

In response to an event message of an unregistered object, the event processing unit holds event messages, and issues an error message. Then, an object generation message is automatically issued based on the error message, and the event processing unit changes a provisional object to a permanent object. According to this processing, it is possible to perform object registration and event processing for the event message of the unregistered object while curbing the influence on stream processing of the event stream processing system.

By maintaining event messages as nonvolatile states in a provisional object, only one-time processing of each event message is ensured to be guaranteed. If issuance of the object generation message and re-inputting of an event message to the message queue MSG_QUE_1 are automatically performed when a provisional object has been generated, it is conceived that, when processing of the object generation message falls, a provisional object is additionally generated for a reissued event message and processing becomes an infinite loop. The present embodiment can avoid such an infinite loop.

Further, when the automatic object generation unit is not able to automatically issue the object generation message based on the error message, a provisional object provisionally generated by the event processing unit is deleted through the flush ghost message.

Even when global registration of the object generation message automatically generated by the automatic object generation unit based on the error message has failed, the group management unit may generate the flush ghost message such that the event processing unit deletes a provisional object.

According to the present embodiment, an object generation message issuance loop counter to a processing flow from the message queues MSG_QUE to event processing units of a plurality of stages illustrated in FIG. 5 is not generated. Accordingly, the influence on stream processing of the event stream processing system can be curbed.

Second Embodiment

Figure 20:
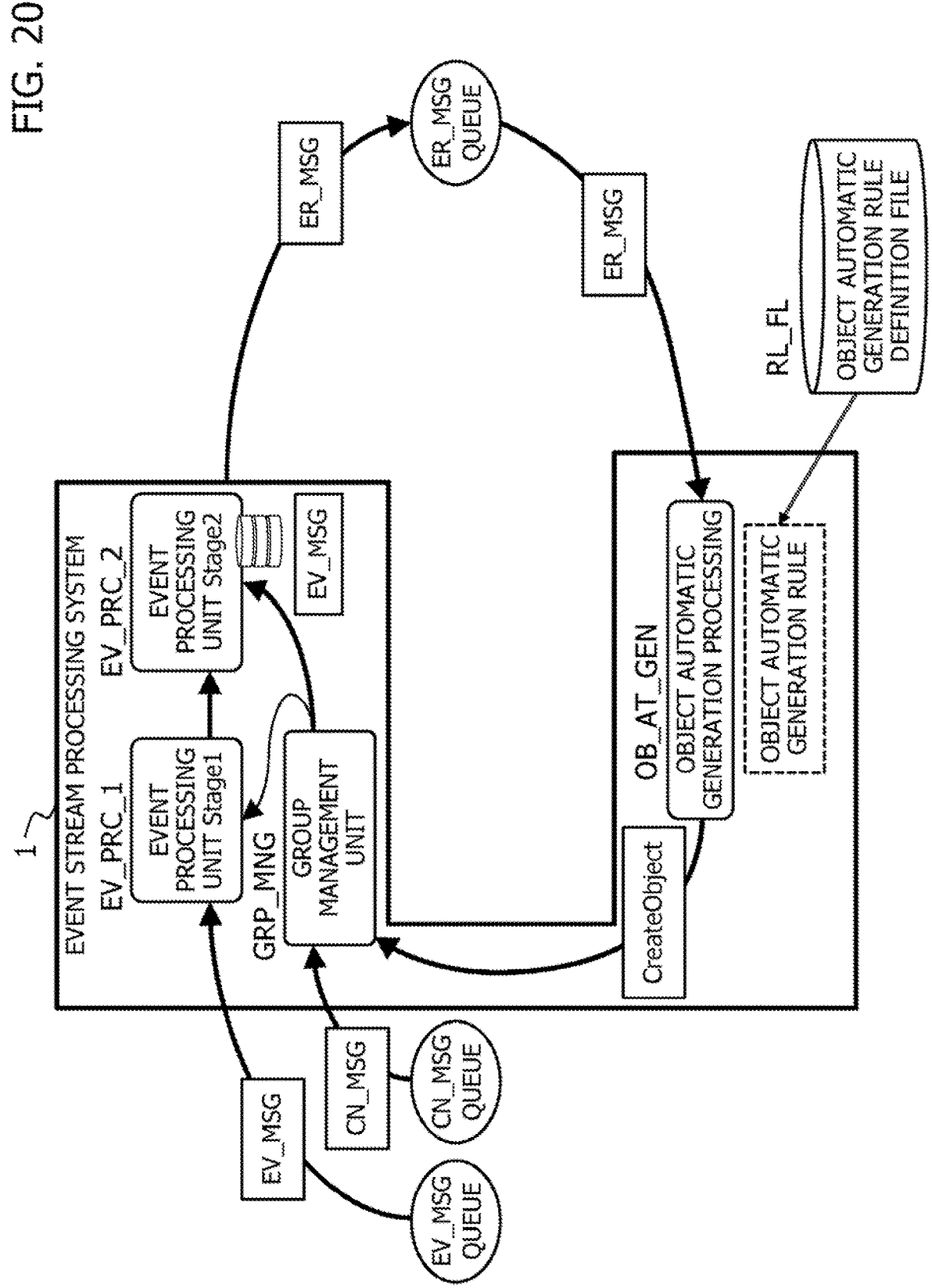
FIG. 20 is a diagram illustrating a configuration example of an event stream processing system of a second embodiment.

FIG. 20 is a diagram illustrating a configuration example of an event stream processing system of a second embodiment. In the example of FIG. 5, processing of the automatic object generation unit OB_AT_GEN and processing of the event stream processing system are separately generated and the object generation message issued by processing of the automatic object generation unit is input to the group management unit of processing of the event stream processing system through the second message queue MSG_QUE_2. In contrast, in the example of FIG. 20, processing of the automatic object generation unit and processing of the event stream processing system are performed as common processing. Accordingly, the object generation message issued by the automatic object generation unit is input to the group management unit in the event stream processing system without passing through the second message queue MSG_QUE_2. Although the message is transferred through a queue when processing of the automatic object generation unit and processing of the event stream processing system are different, it is not needed in the same processing.

According to the first aspect, it is possible to perform stream processing of an event message transmitted from an unregistered object.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An event stream processing system comprising:
   a processor; and
   a storage which is accessed by the processor and stores an object table, in which an object identifier for identifying an object is associated with state information of the object, and also stores a plug-in which executes processing corresponding to the state information, wherein
   the processor executes
   an event processing which, in response to an event message from an event generation device, which is an event generation source, and with reference to the object table, updates state information of an object table corresponding to an object identifier of the event message, and executes the plug-in corresponding to updated state information, and
   an object generation processing,
   the event processing includes an object management which, in response to a first object generation message, generates an entry of the object table corresponding to an object identifier of the first object generation message,
   the event processing generates, in response to the event message and when the object table of the object identifier of the event message is unregistered, a provisional object table corresponding to the object identifier of the event message, and stores the event message in association with the provisional object table, and moreover issues an error message having the object identifier,
   the object generation processing issues, in response to the error message, a second object generation message having the object identifier, and
   the event processing generates, in response to the second object generation message, a permanent object table from the provisional object table conforming to the object identifier of the second object generation message and executes a plug-in corresponding to the object identifier and state information of the event message stored in association with the provisional object table.

2. The event stream processing system according to claim 1, wherein
   the object table includes
   an object state table in which the object identifier is associated with a state,
   an object group table in which the object identifier is associated with a group representing characteristics of the object, and
   a plug-in management table in which the state information belonging to the group is associated with the plug-in, and
   the processor further executes a group management which, in response to the first and second object generation messages, generates a group-affiliated object table in which group in each of the first and second object generation messages is associated with the object identifier of an object belonging to the group, and transfers the first and second object generation messages to the event processing corresponding to the object identifier of each of the first and second object generation messages.

3. The event stream processing system according to claim 2, wherein
   the object generation processing analyzes the object identifier included in the error message based on a plurality of rules which determine a group corresponding to an object identifier, detects a group corresponding to a rule matching the object identifier, and generates the second object generation message including the object identifier and the detected group, and
   the event processing generates the object group table based on the object identifier and the group of the second object generation message.

4. The event stream processing system according to claim 3, wherein the event processing processes the event message stored in association with the provisional object table and executes plug-in corresponding to the updated state information in the event message based on group included in the event message, the object group table, and the plug-in management table.

5. The event stream processing system according to claim 3, wherein
   the object generation processing issues a provisional object deletion message for deleting the provisional object table when a group corresponding to the rule matching the object identifier is not detected, and
   the event processing unit deletes the provisional object table in response to the provisional object deletion message.

6. The event stream processing system according to claim 2, wherein
   the group management issues, in response to the second object generation message and when an entry of the group-affiliated object table corresponding to the object identifier of the second object generation message is registered, a provisional object deletion message for deleting the provisional object table, and
   the event processing deletes, in response to the provisional object deletion message, the provisional object table.

7. A method of event stream processing comprising:
   a processor accessing a storage which stores an object table, in which an object identifier for identifying an object is associated with state information of the object, and also stores a plug-in which executes processing corresponding to the state information, and the processor executing an event processing which, in response to an event message from an event generation device, which is an event generation source, and with reference to the object table, updates state information of an object table corresponding to an object identifier of the event message, and executes the plug-in corresponding to updated state information, and an object generation processing, wherein the event processing includes an object management which, in response to a first object generation message, generates an entry of the object table corresponding to an object identifier of the first object generation message, the event processing generates, in response to the event message and when the object table of the object identifier of the event message is unregistered, a provisional object table corresponding to the object identifier of the event message, and stores the event message in association with the provisional object table, and moreover issues an error message having the object identifier, the object generation processing issues, in response to the error message, a second object generation message having the object identifier, and the event processing generates, in response to the second object generation message, a permanent object table from the provisional object table conforming to the object identifier of the second object generation message and executes a plug-in corresponding to the object identifier and state information of the event message stored in association with the provisional object table.

8. A non-transitory computer readable storage medium that stores therein an event steam processing program causing a processor to execute an event stream processing comprising:

accessing a storage which stores an object table, in which an object identifier for identifying an object is associated with state information of the object, and also stores a plug-in which executes processing corresponding to the state information, and executing an event processing which, in response to an event message from an event generation device, which is an event generation source, and with reference to the object table, updates state information of an object table corresponding to an object identifier of the event message, and executes the plug-in corresponding to updated state information, and an object generation processing, wherein the event processing includes an object management which, in response to a first object generation message, generates an entry of the object table corresponding to an object identifier of the first object generation message, the event processing generates, in response to the event message and when the object table of the object identifier of the event message is unregistered, a provisional object table corresponding to the object identifier of the event message, and stores the event message in association with the provisional object table, and moreover issues an error message having the object identifier, the object generation processing issues, in response to the error message, a second object generation message having the object identifier, and the event processing generates, in response to the second object generation message, a permanent object table from the provisional object table conforming to the object identifier of the second object generation message and executes a plug-in corresponding to the object identifier and state information of the event message stored in association with the provisional object table.

\* \* \* \* \*